(12) United States Patent
Kane et al.

(10) Patent No.: US 8,174,853 B2
(45) Date of Patent: *May 8, 2012

(54) VARIABLE SPEED DRIVE

(75) Inventors: Ajit W. Kane, Dover, PA (US); Ivan Jadric, York, PA (US); Shreesha Adiga-Manoor, York, PA (US); Michael Todd, Jacobus, PA (US); Konstantin Borisov, York, PA (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/034,308

(22) Filed: Feb. 24, 2011

(65) Prior Publication Data

US 2011/0141774 A1 Jun. 16, 2011

Related U.S. Application Data

(63) Continuation-in-part of application No. 11/978,939, filed on Oct. 30, 2007, now Pat. No. 7,957,166.

(51) Int. Cl.
*H02M 1/12* (2006.01)
(52) U.S. Cl. .......................... 363/40; 363/44
(58) Field of Classification Search ............. 363/34–37, 363/40–48; 336/90; 318/611, 629, 632
See application file for complete search history.

(56) References Cited

U.S. PATENT DOCUMENTS

| | | | |
|---|---|---|---|
| 3,593,103 A | 7/1971 | Chandler et al. | |
| 4,308,491 A | 12/1981 | Joyner, Jr. et al. | |
| 4,587,474 A | 5/1986 | Espelage et al. | |
| 4,758,771 A | 7/1988 | Saito et al. | |
| 5,081,368 A | 1/1992 | West | |
| 5,123,080 A | 6/1992 | Gillett et al. | |
| 5,127,085 A | 6/1992 | Becker et al. | |
| 5,298,848 A | 3/1994 | Ueda et al. | |
| 5,410,230 A | 4/1995 | Bessler et al. | |
| 5,592,058 A | 1/1997 | Archer et al. | |
| 5,646,458 A | 7/1997 | Bowyer et al. | |
| 5,747,955 A | 5/1998 | Rotunda et al. | |
| 5,796,234 A | 8/1998 | Vrionis | |

(Continued)

FOREIGN PATENT DOCUMENTS

DE 102004052700 A1 8/2006

(Continued)

OTHER PUBLICATIONS

Annabelle Van Zyl, Rene Spee, Alex Faveluke, and Shibashis Bhowmik; Voltage Sag Ride-Through for Adjustable-Speed Drives with Active Rectifiers; Nov./Dec., 1998; vol. 34, Issue No. 6; IEEE Transactions on Industry Applications.

(Continued)

*Primary Examiner* — Jessica Han
(74) *Attorney, Agent, or Firm* — McNees Wallace & Nurick LLC

(57) ABSTRACT

Systems and methods for improved VSDs are provided. One embodiment relates to an apparatus for common mode and differential mode filtering for motor or compressor bearing protection when operating with VSDs, including conducted EMI/RFI input power mains mitigation. Another embodiment relates to a method to extend the synchronous operation of an Active Converter to the AC mains voltage during complete line dropout. Another embodiment relates to an Active Converter-based Variable Speed Drive system with Improved Full Speed Efficiency.

19 Claims, 19 Drawing Sheets

U.S. PATENT DOCUMENTS

| | | | |
|---|---|---|---|
| 5,869,946 | A | 2/1999 | Carobolante |
| 5,936,855 | A | 8/1999 | Salmon |
| 5,969,966 | A | 10/1999 | Sawa et al. |
| 6,005,362 | A | 12/1999 | Enjeti et al. |
| 6,072,302 | A | 6/2000 | Underwood et al. |
| 6,118,676 | A | 9/2000 | Divan et al. |
| 6,160,722 | A | 12/2000 | Thommes et al. |
| 6,239,513 | B1 | 5/2001 | Dean et al. |
| 6,276,148 | B1 | 8/2001 | Shaw |
| 6,313,600 | B1 | 11/2001 | Hammond et al. |
| 6,348,775 | B1 | 2/2002 | Edelson et al. |
| 6,487,096 | B1 | 11/2002 | Gilbreth et al. |
| 6,559,562 | B1 | 5/2003 | Rostron |
| 6,686,718 | B2 | 2/2004 | Jadric et al. |
| 6,768,284 | B2 | 7/2004 | Lee et al. |
| 6,801,019 | B2 | 10/2004 | Haydock et al. |
| 7,081,734 | B1 | 7/2006 | Jadric et al. |
| 7,116,076 | B2 | 10/2006 | Sippola et al. |
| 7,629,836 | B2 | 12/2009 | Kull et al. |
| 7,659,797 | B2 | 2/2010 | Tucker |
| 7,667,988 | B2 | 2/2010 | Haeberle et al. |
| 7,746,020 | B2 | 6/2010 | Schnetzka et al. |
| 7,957,166 | B2 * | 6/2011 | Schnetzka et al. ......... 363/56.03 |
| 2002/0195973 | A1 | 12/2002 | Hu et al. |
| 2003/0015873 | A1 | 1/2003 | Khalizadeh et al. |
| 2003/0052544 | A1 | 3/2003 | Yamamoto et al. |
| 2005/0057210 | A1 | 3/2005 | Ueda et al. |
| 2005/0068001 | A1 | 3/2005 | Skaug et al. |
| 2006/0250105 | A1 | 11/2006 | Jadric et al. |
| 2007/0063668 | A1 | 3/2007 | Schnetzka et al. |

FOREIGN PATENT DOCUMENTS

| | | |
|---|---|---|
| DE | 102005005688 A1 | 8/2006 |
| EP | 0272776 A2 | 6/1988 |
| EP | 0283954 A2 | 9/1988 |
| EP | 0422221 A1 | 11/1989 |
| EP | 1300937 A2 | 4/2003 |
| EP | 0313366 A2 | 8/2008 |
| JP | 06105563 | 9/1992 |
| JP | 05068376 | 3/1993 |
| JP | 2002176767 | 6/2002 |
| JP | 04026374 | 9/2006 |
| WO | 9314559 A1 | 7/1993 |
| WO | 9732168 A1 | 9/1997 |
| WO | 0062396 A | 10/2000 |
| WO | 03094334 A | 11/2003 |

OTHER PUBLICATIONS

Annette Von Jouanne, Prasad N. Enjeti and Basudeb Banerjee; Assessment of Ride-Through Alternatives for Adjustable-Speed Drives; Jul./Aug. 1999; vol. 35, Issue No. 4; IEEE Transactions on Industry Applications.

Manjrekar M D et al: "An Auxiliary Zero State Synthesizer to Reduce Common Mode Voltage in Three-Phase Inverters" Industry Applications Conference, 1999. Thirty-Fourth IAS Annual Meeting Conference Record of the 1999 IEEE Phoenix, AZ, USA Oct. 3-7, 1999, Piscataway, NJ, USA, IEEE, US, vol. 1, Oct. 3, 1999, pp. 54-59, XPO10355205 ISBN: 978-0-7803-5589-7.

"Output filter for motor drives", Schaffner, www.schaffner.com, May 2006.

"Sine wave output filter for motor drives", Schaffner, www.schaffner.com, May 2006.

"Sine wave and EMC output filter for motor drives with a voltage dc link", Schaffner,www.schaffner.com, May 2006.

"Sine wave output filter for high-speed motor drives", Schaffner, www.schaffner.com, May 2006.

"Add-on sine wave output filter module for common mode voltage improvement", Schaffner, www.schaffner.com, May 2006.

"Three-phase harmonics and EMC filter", Schaffner, www.schaffner.com, May 2006.

Muetze, Annette, "Bearing Currents in Inverter-Fed AC Motors", PhD dissertation, Elektrotechnik und Informationstechnik det Technischen Universitaet Darmstadt, Feb. 2, 1974.

* cited by examiner

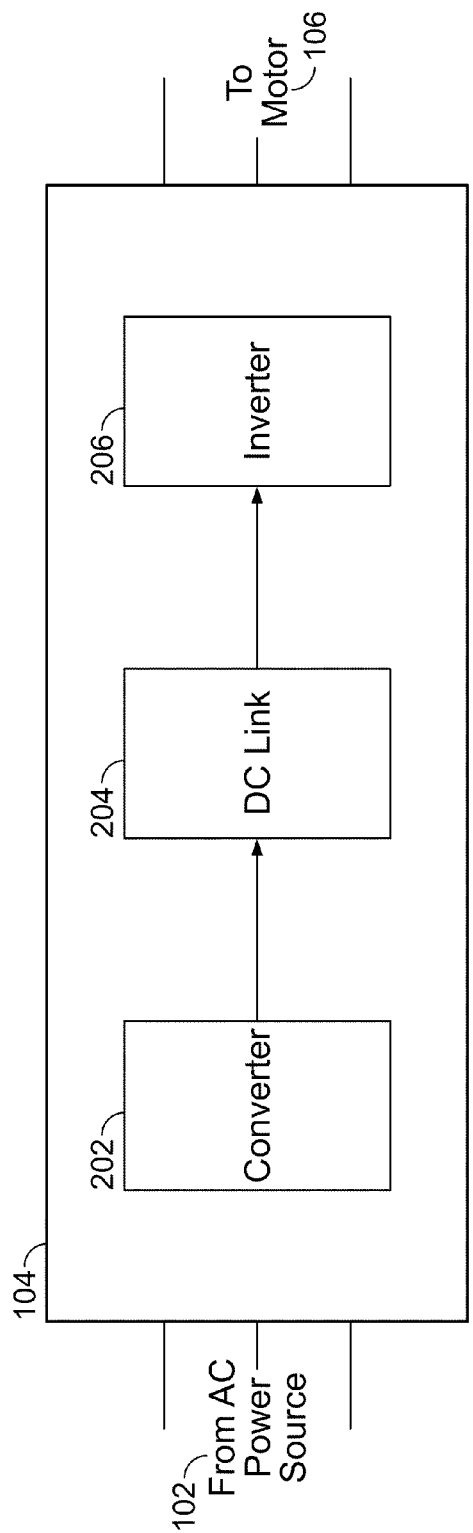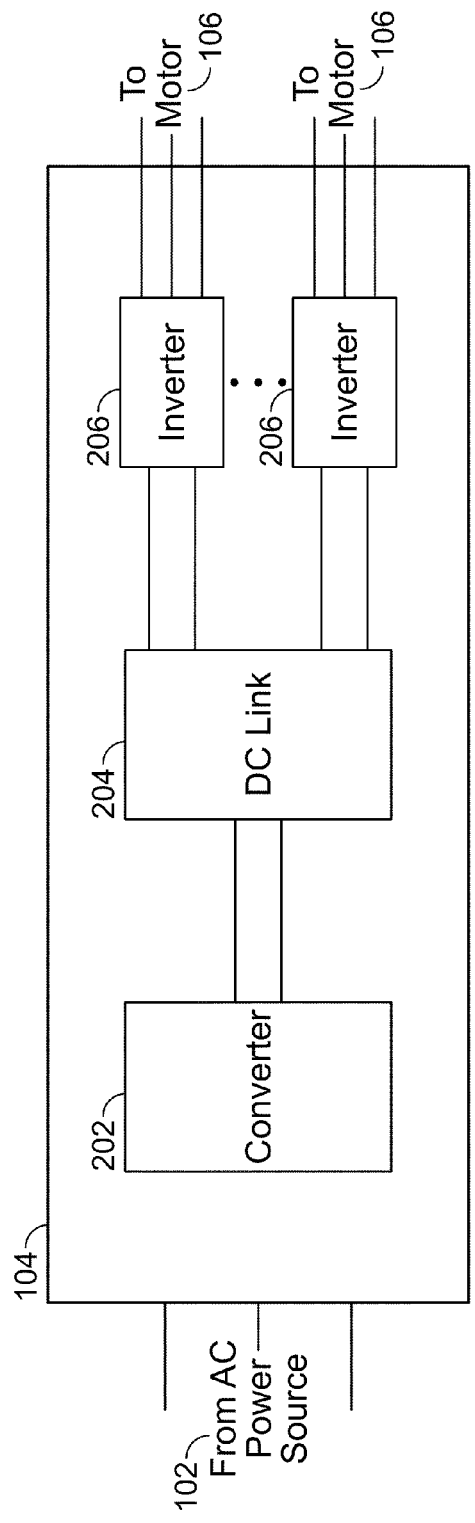

VARIABLE SPEED DRIVE

CROSS-REFERENCE TO RELATED APPLICATIONS

This application is a continuation in part of U.S. patent application Ser. No. 11/978,939, filed Oct. 30, 2007, entitled VARIABLE SPEED DRIVE, which is hereby incorporated by reference.

BACKGROUND

The present application relates generally to variable speed drives. The application relates more specifically to an input filter for a variable speed drive to filter line to ground voltages and reduce high frequency distortion in the converter stage.

A variable speed drive (VSD) for heating, ventilation, air-conditioning and refrigeration (HVAC&R) applications typically includes a rectifier or converter, a DC link, and an inverter. The rectifier or converter converts the fixed line frequency, fixed line voltage AC power from an AC power source into DC power. The DC link filters the DC power from the converter and typically contains a large amount of electrical capacitance. Finally, the inverter is connected in parallel with the DC link and converts the DC power from the DC link into a variable frequency, variable voltage AC power.

If a high frequency distortion of the line to ground voltage ($V_{lg}$) is present at the input of the VSD, the voltage across the input devices ($V_{ce}$) can become distorted. The distortion of $V_{ce}$ may cause high voltage transients across the input devices of the VSD in addition to the normal input voltage to the VSD. If the high voltage transients combined with the input voltage exceed the maximum permissible rated voltage for an input device of the VSD, the device may fail. A failure can occur when the input devices are not switching or operating, but are still connected to the input lines.

The traditional solution to the problem of high frequency distortion of $V_{lg}$ is to provide a galvanically isolated disconnect, e.g., a contactor, between the VSD and AC power source. The galvanically isolated disconnect isolates the input devices from the high frequency distortion of $V_{lg}$, when the input devices are not switching. The galvanically isolated disconnect increases the cost, size, complexity and weight of the VSD. Another solution to mitigate high frequency distortion of $V_{lg}$ may be to use input devices rated at a higher voltage. Devices with higher voltage ratings, however, increase the cost of the VSD and may reduce its efficiency.

What is needed is a system and/or method that satisfy one or more of these needs or provides other advantageous features. The present application is directed to both VSDs that incorporate an active converter type AC to DC converter topology and VSDs utilizing conventional AC to DC rectifier converters.

Other features and advantages will be made apparent from the present specification. The teachings disclosed extend to those embodiments that fall within the scope of the claims, regardless of whether they accomplish one or more of the aforementioned needs.

SUMMARY

The present invention is directed to a circuit for three-phase Pulse Width Modulated (PWM) VSDs, and preferably for PWM VSDs having active converter topologies.

In one embodiment, a variable speed drive system is disclosed. The variable speed drive system is arranged to receive an input AC power at a fixed AC input voltage and frequency and provide an output AC power at a variable voltage and variable frequency. The variable speed drive includes a converter stage connected to a three phase AC power source providing the input AC voltage. The converter stage is configured to convert the input AC voltage to a boosted DC voltage. A DC link is connected to the converter stage. the DC link is configured to filter and store the boosted DC voltage from the converter stage. An inverter stage is connected to the DC link. the inverter stage is configured to convert the boosted DC voltage from the DC link into the output AC power having the variable voltage and the variable frequency. The variable speed drive includes an input filter with a three-phase input capacitor bank including three capacitors connected in a wye configuration. Each respective capacitor of the three capacitors is connected between one phase of the three phase AC power source at a first end of the respective capacitor, and a common point at a second end of the respective capacitor. A grounding capacitor is connected between the common point and earth ground. The three-phase input capacitor bank is configured to filter line to ground voltages to reduce or substantially eliminate high frequency distortion across the converter stage.

In another embodiment, an input filter is provided for reducing or eliminating high frequency distortion of line to ground voltages. The input filter includes a three-phase inductor having three windings, wherein each winding of the three-phase inductor further includes a center tap. The center tap divides each winding of the three-phase inductor into a pair of inductor sections. A three-phase input capacitor bank includes three capacitors connected in a wye configuration to the three center taps at one end, and to a common point at the opposite end. A grounding capacitor is connected between the common point and earth ground. The three-phase input capacitor bank is configured to filter line to ground voltages to substantially eliminate high frequency voltage transients across an input of a converter stage.

One advantage is to reduce the common mode and differential mode currents associated with conducted electromagnetic interference and radio frequency interference present at the AC power source as a result of the operation of the VSD.

A second advantage is the integral bypass active converter configuration may be utilized for VSD controlled systems that operate at a maximum frequency & voltage equal to the power line mains frequency supplied to the VSD. Contactor bypass eliminates the losses associated with the VSD when the system is required to operate at maximum frequency.

Another advantage is a ground fault protection system in an active converter for instantaneously interrupting a ground fault at an input phase of the active converter, using reverse blocking IGBTs to controllably switch off fault current in response to a sensed fault.

Still another advantage is improved cooling and reduced size, weight and cost of the inductor.

Alternative exemplary embodiments relate to other features and combinations of features as may be generally recited in the claims.

BRIEF DESCRIPTION OF THE FIGURES

The application will become more fully understood from the following detailed description, taken in conjunction with the accompanying figures, wherein like reference numerals refer to like elements.

FIGS. 2A and 2B show schematically embodiments of variable speed drives.

DETAILED DESCRIPTION OF THE EXEMPLARY EMBODIMENTS

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1A:
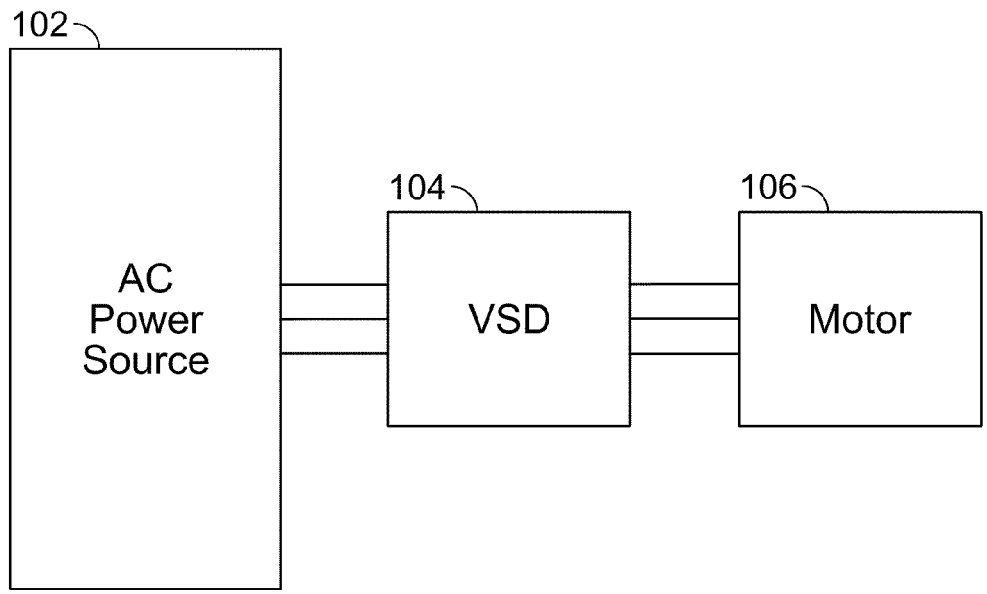
FIGS. 1A and 1B show schematically embodiments of general system configurations.
Figure 1B:
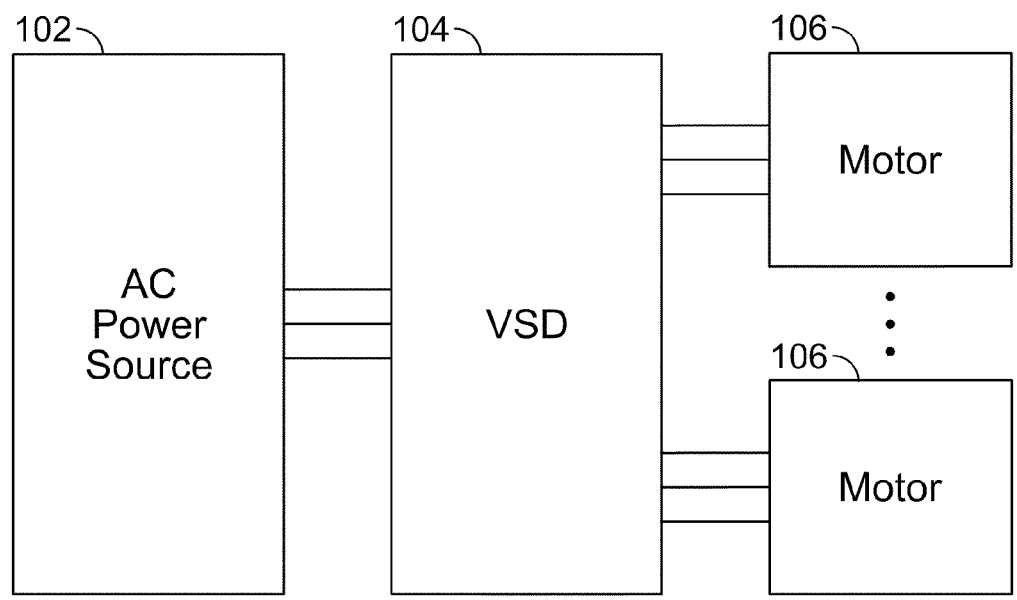

FIGS. 1A and 1B show general system configurations. An AC power source 102 supplies a variable speed drive (VSD) 104, which powers a motor 106 (see FIG. 1A) or motors 106 (see FIG. 1B). The motor(s) 106 can be used to drive a corresponding compressor of a vapor compression system (see generally, FIG. 3). The AC power source 102 provides single phase or multi-phase (e.g., three phase), fixed voltage, and fixed frequency AC power to the VSD 104 from an AC power grid or distribution system that is present at a site. The AC power source 102 can supply an AC voltage or line voltage of 200 V, 230 V, 380 V, 460 V, or 600 V, at a line frequency of 50 Hz or 60 Hz, to the VSD 104 depending on the corresponding AC power grid.

The VSD 104 receives AC power having a particular fixed line voltage and fixed line frequency from the AC power source 102 and provides AC power to the motor(s) 106 at a desired voltage and desired frequency, both of which can be varied to satisfy particular requirements. The VSD 104 can provide AC power to the motor(s) 106 having higher voltages and frequencies and lower voltages and frequencies than the rated voltage and frequency of the motor(s) 106. In another embodiment, the VSD 104 may again provide higher and lower frequencies but only the same or lower voltages than the rated voltage and frequency of the motor(s) 106. The motor(s) 106 can be an induction motor switched reluctance motor or permanent magnet motor, but can include any type of motor that is capable of being operated at variable speeds.

FIGS. 2A and 2B show different embodiments of the VSD 104. The VSD 104 can have three stages: a converter stage 202, a DC link stage 204 and an output stage having one inverter 206 (see FIG. 2A) or a plurality of inverters 206 (see FIG. 2B). The converter 202 converts the fixed line frequency, fixed line voltage AC power from the AC power source 102 into DC power. The DC link 204 filters the DC power from the converter 202 and provides energy storage components. The DC link 204 can be composed of capacitors, inductors, or a combination thereof, which are passive devices that exhibit high reliability rates and very low failure rates. Finally, in the embodiment of FIG. 2A, the inverter 206 converts the DC power from the DC link 204 into variable frequency, variable voltage AC power for the motor 106 and, in the embodiment of FIG. 2B, the inverters 206 are connected in parallel on the DC link 204 and each inverter 206 converts the DC power from the DC link 204 into a variable frequency, variable voltage AC power for a corresponding motor 106. The inverter(s) 206 can be a power module that can include power transistors, insulated gate bipolar transistor (IGBT) power switches and inverse diodes interconnected with wire bond technology. Furthermore, it is to be understood that the DC link 204 and the inverter(s) 206 of the VSD 104 can incorporate different components from those discussed above so long as the DC link 204 and inverter(s) 206 of the VSD 104 can provide the motors 106 with appropriate output voltages and frequencies.

With regard to FIGS. 1B and 2B, the inverters 206 can be jointly controlled by a control system such that each inverter 206 provides AC power at the same desired voltage and frequency to corresponding motors based on a common control signal or control instruction provided to each of the inverters 206. In another embodiment, the inverters 206 can be individually controlled by a control system to permit each inverter 206 to provide AC power at different desired voltages and frequencies to corresponding motors 106 based on the separate control signals or control instructions provided to each inverter 206. Individually controlling inverters 206 permits the inverters 206 of the VSD 104 to more effectively satisfy motor 106 and system demands and loads independent of the requirements of other motors 106 and systems connected to other inverters 206. For example, one inverter 206 can be providing full power to a motor 106, while another inverter 206 is providing half power to another motor 106. The control of the inverters 206 in either embodiment can be by a control panel or other suitable control device.

For each motor 106 to be powered by the VSD 104, there is a corresponding inverter 206 in the output stage of the VSD 104. The number of motors 106 that can be powered by the VSD 104 is dependent upon the number of inverters 206 that are incorporated into the VSD 104. In one embodiment, there can be either 2 or 3 inverters 206 incorporated in the VSD 104 that are connected in parallel to the DC link 204 and used for powering a corresponding motor 106. While the VSD 104 can have between 2 and 3 inverters 206, it is to be understood that more than 3 inverters 206 can be used so long as the DC link 204 can provide and maintain the appropriate DC voltage to each of the inverters 206.

Figure 3:
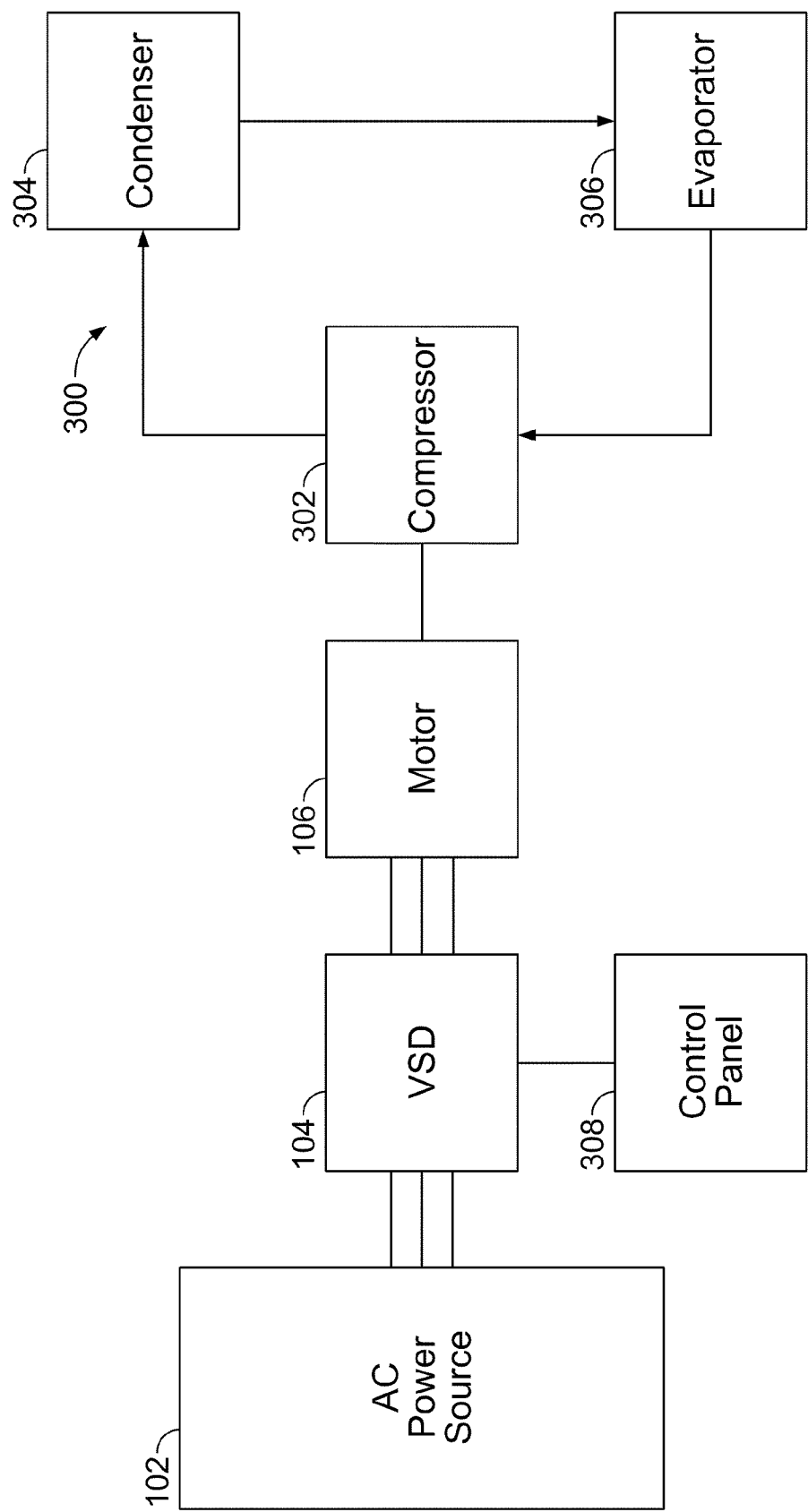
FIG. 3 shows schematically an embodiment of a vapor compression system.

FIG. 3 shows an embodiment of a vapor compression system using the system configuration and VSD 104 of FIGS. 1A and 2A. As shown in FIG. 3, the vapor compression system 300 includes a compressor 302, a condenser 304, a liquid chiller or evaporator 306 and a control panel 308. The compressor 302 is driven by motor 106 that is powered by VSD 104. The VSD 104 receives AC power having a particular fixed line voltage and fixed line frequency from AC power source 102 and provides AC power to the motor 106 at desired voltages and desired frequencies, both of which can be varied to satisfy particular requirements. The control panel 308 can include a variety of different components such as an analog to digital (A/D) converter, a microprocessor, a non-volatile memory, and an interface board, to control operation of the vapor compression system 300. The control panel 308 can also be used to control the operation of the VSD 104, and the motor 106.

Compressor 302 compresses a refrigerant vapor and delivers the vapor to the condenser 304 through a discharge line. The compressor 302 can be any suitable type of compressor, e.g., screw compressor, centrifugal compressor, reciprocating compressor, scroll compressor, etc. The refrigerant vapor delivered by the compressor 302 to the condenser 304 enters into a heat exchange relationship with a fluid, e.g., air or water, and undergoes a phase change to a refrigerant liquid as a result of the heat exchange relationship with the fluid. The condensed liquid refrigerant from condenser 304 flows through an expansion device (not shown) to the evaporator 306.

The evaporator 306 can include connections for a supply line and a return line of a cooling load. A secondary liquid or process fluid, e.g., water, ethylene glycol, calcium chloride brine or sodium chloride brine, travels into the evaporator 306 via return line and exits the evaporator 306 via supply line. The liquid refrigerant in the evaporator 306 enters into a heat exchange relationship with the secondary liquid to lower the temperature of the secondary liquid. The refrigerant liquid in the evaporator 306 undergoes a phase change to a refrigerant vapor as a result of the heat exchange relationship with the secondary liquid. The vapor refrigerant in the evaporator 306 exits the evaporator 306 and returns to the compressor 302 by a suction line to complete the cycle. It is to be understood that any suitable configuration of condenser 304 and evaporator 306 can be used in the system 300, provided that the appropriate phase change of the refrigerant in the condenser 304 and evaporator 306 is obtained.

Furthermore, while FIG. 3 illustrates the vapor compression system 300 as having one compressor connected in a single refrigerant circuit, it is to be understood that the system 300 can have multiple compressors, powered by a single VSD as shown in FIGS. 1B and 2B or multiple VSD connected into each of one or more refrigerant circuits.

Figure 4:
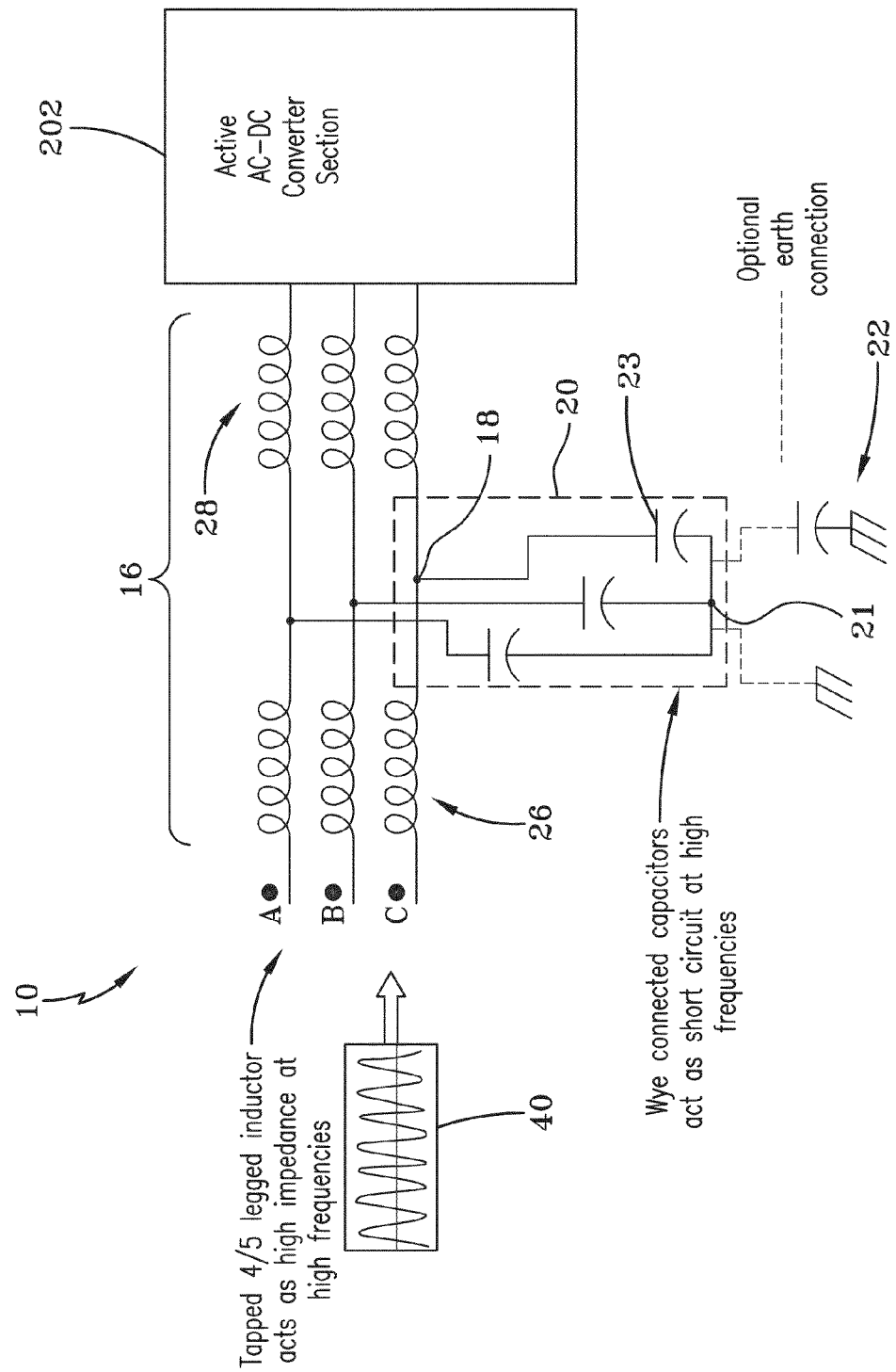
FIG. 4 shows schematically a common mode and differential mode input filter using a four- or five-legged inductor.

Referring next to FIG. 4, there is a schematic diagram of elements of an input filter 10 shown. EMI/RFI sources 40 generated by the active converter 202 can be filtered ahead of the converter 202 by splitting a three-phase AC input inductor 16 into a line-side inductor 26 and load-side inductor 28 per phase. The line-side inductors 26 and load-side inductors 28 are connected by inductor tap portions 18. A capacitive three-phase filter element 20 is wye-connected between the inductor tap portions 18. An optional earth connection 22 may be connected to a common point 21 of the wye-connected filter element 20. The earth connection 22 may alternately include a grounding capacitor 23. The line- and load-side inductors 26 and 28, respectively, and the capacitive filter element 20 are designed with inductance and capacitance values to provide a roll off of the EMI/RFI sources—i.e., high frequency switching components of the input current conducted by the converter 202. The input filter 10 provides a high impedance via the differential mode inductive components of inductances 26 and 28 and a low impedance via the three-phase wye connected capacitance 20 to the EMI/RFI sources, while passing the fundamental component of the power current, e.g., 60 Hz, through the network with minimal impedance. By utilizing a four- or five-legged (⅘) input inductor 16, a common mode inductive component is formed via inductances 26 and 28 and together with the optional earth connection 22 or the grounding capacitor 23, increases the capacity of the filter 10 to prevent common mode current generated by the converter 202 from flowing into the "mains" or AC power source 102. The wye-connection point 21 of the input filter 10 may be directly earthed or alternately earthed through a separate capacitor 23 to provide greater shunting of high-frequency currents to earth. In one embodiment, the inductor 16 may be provided with low inter-winding capacitance.

Line-side inductors 26 provide impedance at a predetermined switching frequency of the VSD 104 between the wye-connected capacitors 20 and the AC power source 102. The impedance of the line-side inductors 26 can be designed to allow the wye-connected capacitors 20 to be more effective than a system with no significant impedance between the input AC power source 102 and the VSD 104. Inductors 26 also provide high-frequency impedance in the reverse direction, to restrict the flow of high-frequency current from the converter 202 to the AC power source 102. Thus the inductors 26 restrict or limit high frequency current from reflecting back to the AC power source 102.

Inductors 28 provide impedance between the capacitors 20 and the input to the VSD 104. Inductors 28 provide high impedance between the AC power source 102 and the active converter 202 portion of the VSD 104. Alternately, if the VSD 104 is a VSD with a passive rectifier or converter, the impedance of inductors 28 isolates the VSD 104 from the input AC power source 102 and reduces high frequency emissions conducted by to the AC power source 102 from the VSD 104.

The wye-connected capacitor bank 20 provides low impedance between phase conductors A, B & C for at least one switching frequency of the VSD 104, and provides low impedance for differential mode current flow. The wye-connected capacitor bank 20 also provides a low impedance path for flow of at least one switching frequency to an earth ground connection 22, assuming that an earth ground connection is provided, for reducing common mode current flow.

Figure 5:
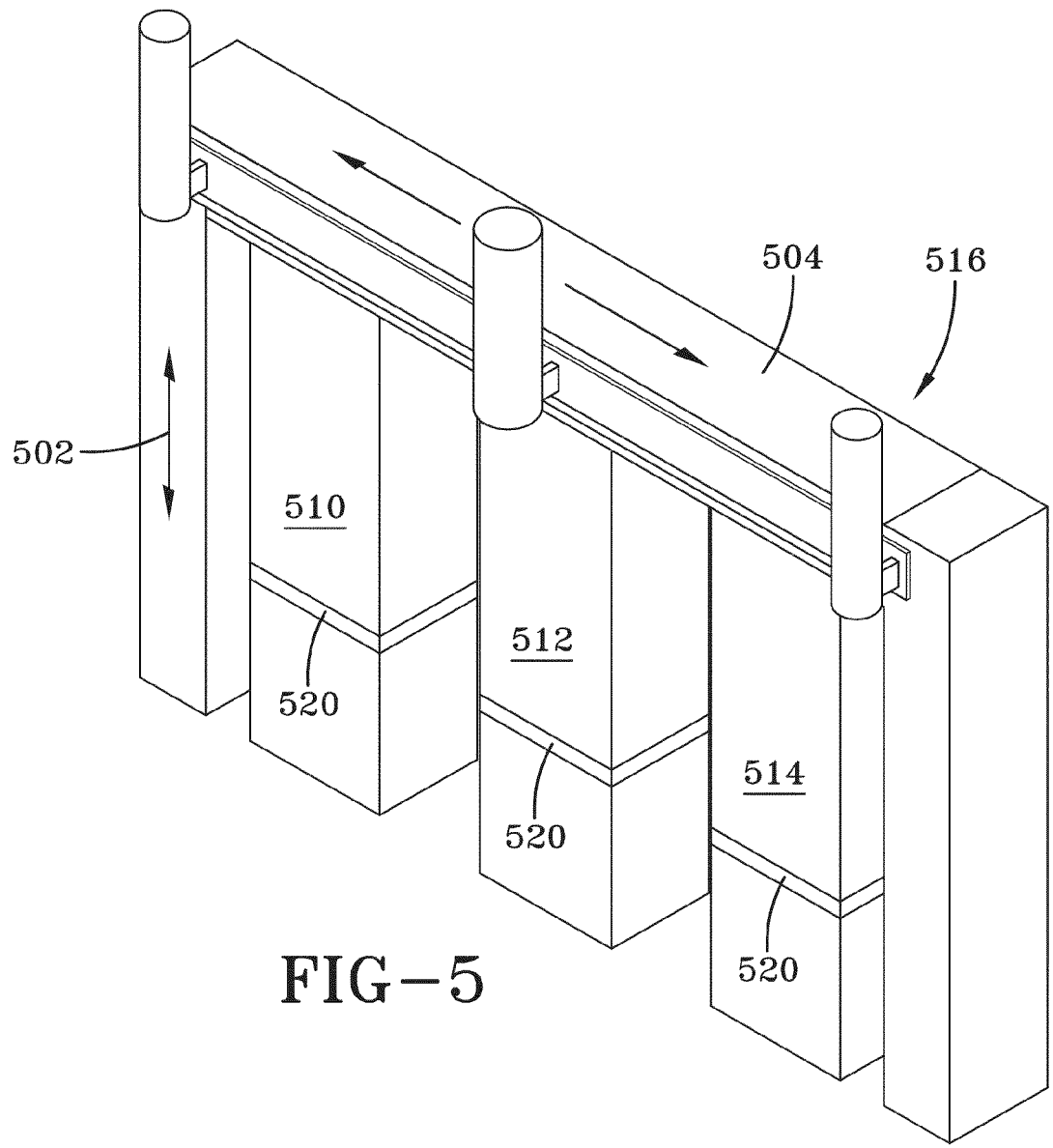
FIG. 5 shows a one-quarter section view of a five-legged inductor core.
Figure 6:
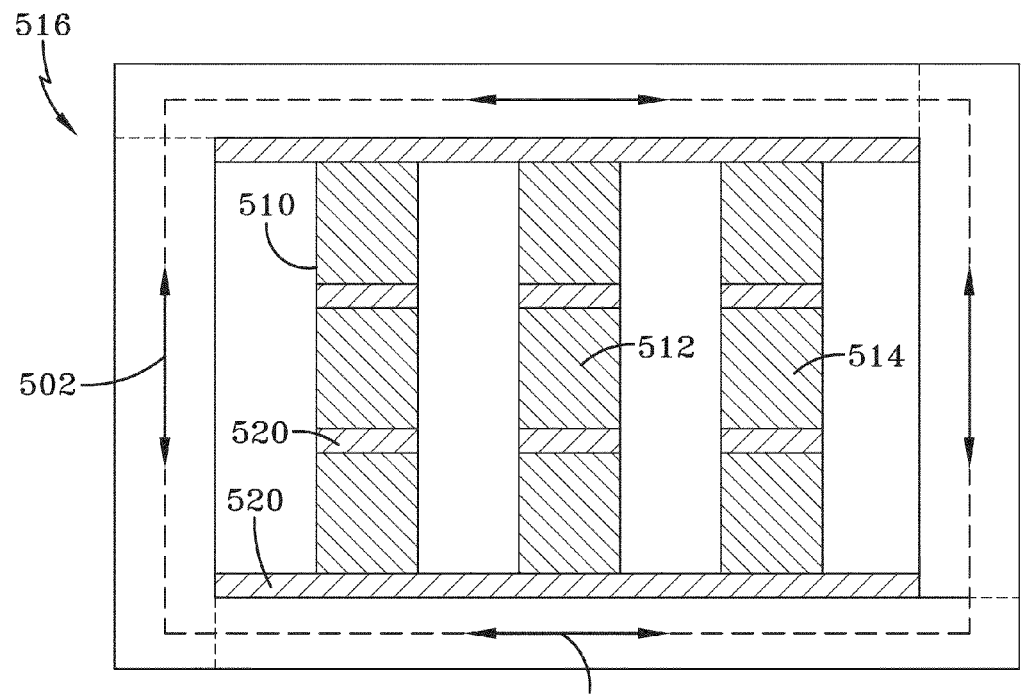
FIG. 6 shows a cross-sectional view of an embodiment of a five-legged inductor core.
Figure 8:
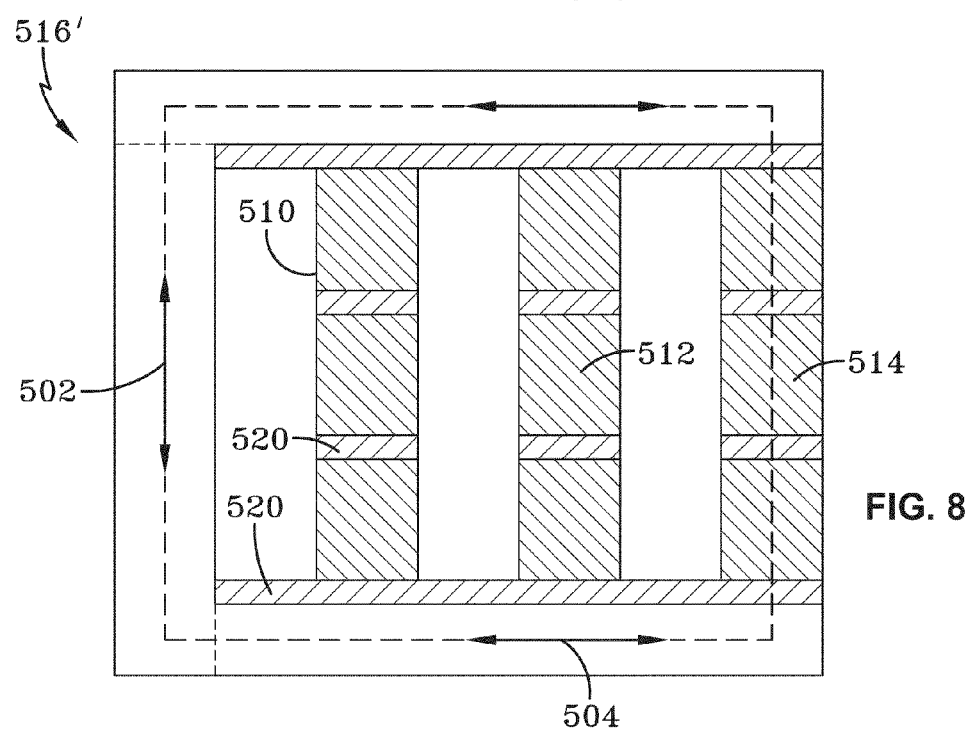
FIG. 8 shows a cross-sectional view of an embodiment of a four-legged inductor core.

In one embodiment, the common mode input filter 10 may be implemented using either a four-legged AC inductor 516' (see, e.g., FIG. 8, or five-legged AC inductor 516 (see e.g., FIGS. 5 and 6), collectively referred to as ⅘ inductor, applied to the input of the VSD 104 with active converter technology. Conventional filters employ three-legged inductors to provide power factor and harmonic input current control. The ⅘ inductor 516 provides both common mode and differential mode inductance. FIGS. 5 and 6 show a five-legged inductor 516, which provides more geometric symmetry in a three-phase power system. The common mode inductance is generated by providing a magnetic flux path 504, indicated by arrow 502. The flux path 504 can be in magnetic communication with three core legs 510, 512 and 514, each of which are connected to one of the phases in the three phase input power 102. The flux path 504 can be a continuous, magnetically permeable magnetic loop that surrounds the inner three core legs 510, 512 and 514. Each of the core legs 510, 512 and 514 can have a coil winding or inductor 26 (see, e.g., FIG. 4) wrapped around substantially the entire surface area of the respective core leg 510, 512 and 514. The direction of the magnetic flux in the flux path can be dependent upon the direction and magnitude of the currents in the coil windings, and are therefore shown as flowing in either direction, although in practice, the magnetic flux may flow in one direction or another about the about the periphery of the inductor 516. The common mode magnetic flux is induced by electrical currents that are common to all three inductor coils 26. The common mode flux path 504 can only be excited by common mode current components flowing through the inductor coils. In one embodiment, inductor 516 can have a liquid-cooled core to improved heat dissipation and increase the power capacity of the inductor 516.

Referring to FIG. 6, the five-legged inductor 516 can have air gaps 520 that are inserted in the legs 510, 512 and 514 to prevent core saturation and increase the working flux density range of the inductor 516. In the inductor 516, an air gap 520 can be arranged between the horizontal sections of the flux path 504. Two air gaps 520 can also be inserted intermediately in each of the core legs 510, 512 and 514, to break up each core leg 510, 512 and 514, into three discrete segments. Other air gap configurations may be used to achieve the same result.

Figure 7:
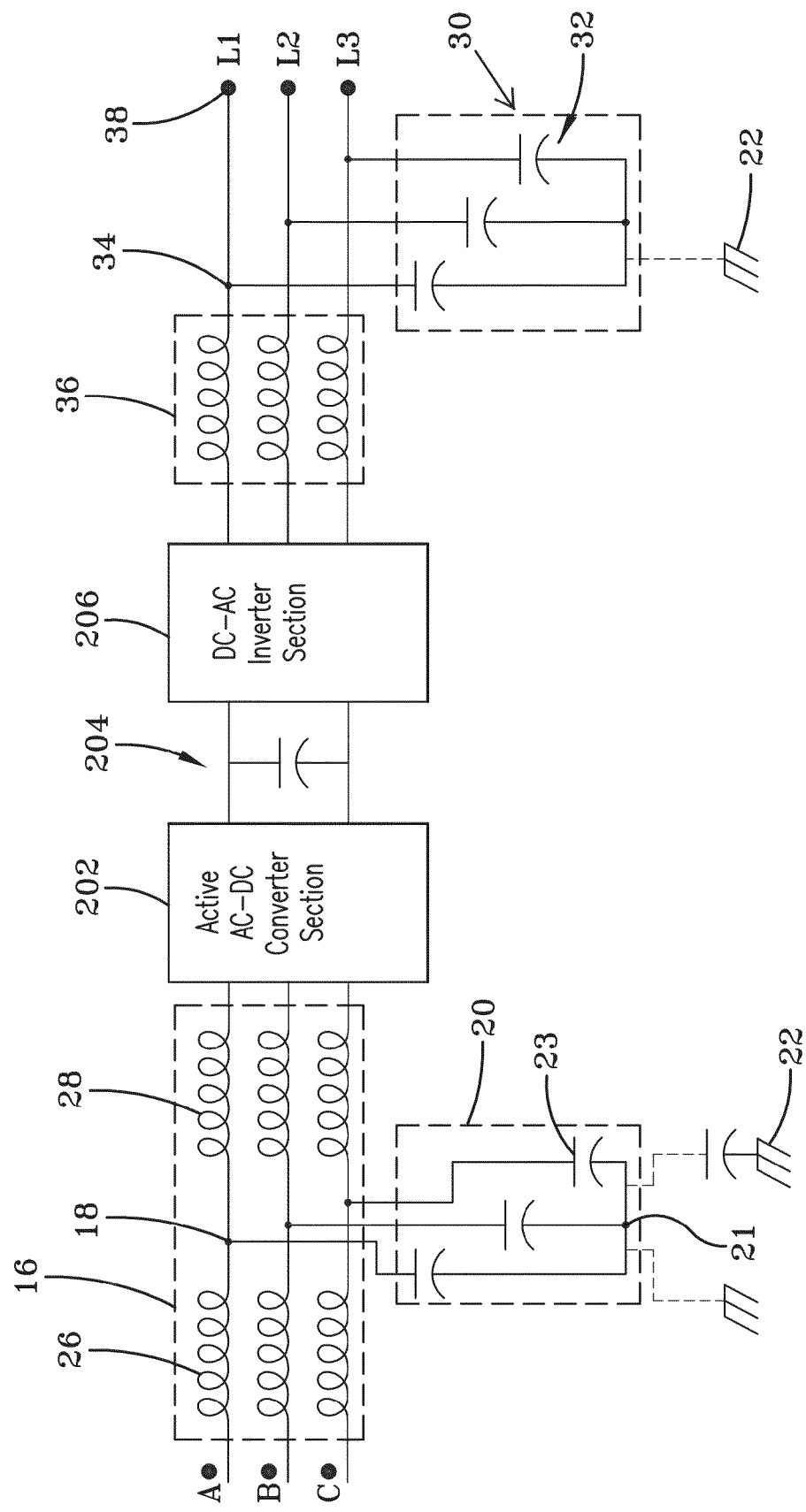
FIG. 7 shows a schematically an alternate embodiment a variable speed drive.

Referring next to FIG. 7, another embodiment of a VSD with an output filter and a common mode/differential mode input filter circuit is shown. The EMI/RFI input filter as described with respect to FIG. 4, above, is connected at the input of the converter 202, and performs the same filtering functions as described with respect to FIG. 4. The addition of the input filter with an inductor 16 at the input to the VSD 104 can effectively provide a high-impedance circuit between the AC power source 102 and the VSD 104. To provide a low impedance path for common mode current flow, a three-phase wye connected capacitor bank 30 including three common mode capacitors 32 are connected between the VSD's motor connection terminal 38, and earth ground 22. The capacitor bank 30 is equivalent to a short circuit—i.e., low impedance—at high frequency, effectively earthing or removing the destructive high frequency AC components present on the three VSD output terminals 34 and shunting the destructive AC components from reaching the motor or other type of load connected to the VSD, thus filtering out currents resulting from common mode voltages. The capacitor bank 30 allows high-frequency AC components to bypass the parasitic capacitive earthing elements of the motor and eliminates bearing damage caused by common mode voltages and currents.

The inverter output terminals 34 feed a second filter arrangement that includes a three phase inductor 36 connected in series with the output terminals 38, which are connected to the system load, e.g., a motor 106. Three-phase capacitor bank 30 is wye-connected to the output power phases, L1, L2 and L3, between the load side of the three phase inductor 36, providing a low impedance path for the differential mode current to flow among the capacitor bank 42. The combination of the second three-phase capacitor bank wye-connected at the load side of the three phase inductor 36 provides an L-C differential mode output filter. By combining the common mode filter capacitor bank 20, with the L-C differential mode inductor 36 and capacitor bank 30 both of the destructive conditions, i.e., common mode and differential mode currents, are prevented from reaching a load that is powered by the VSD 104.

Figure 9:
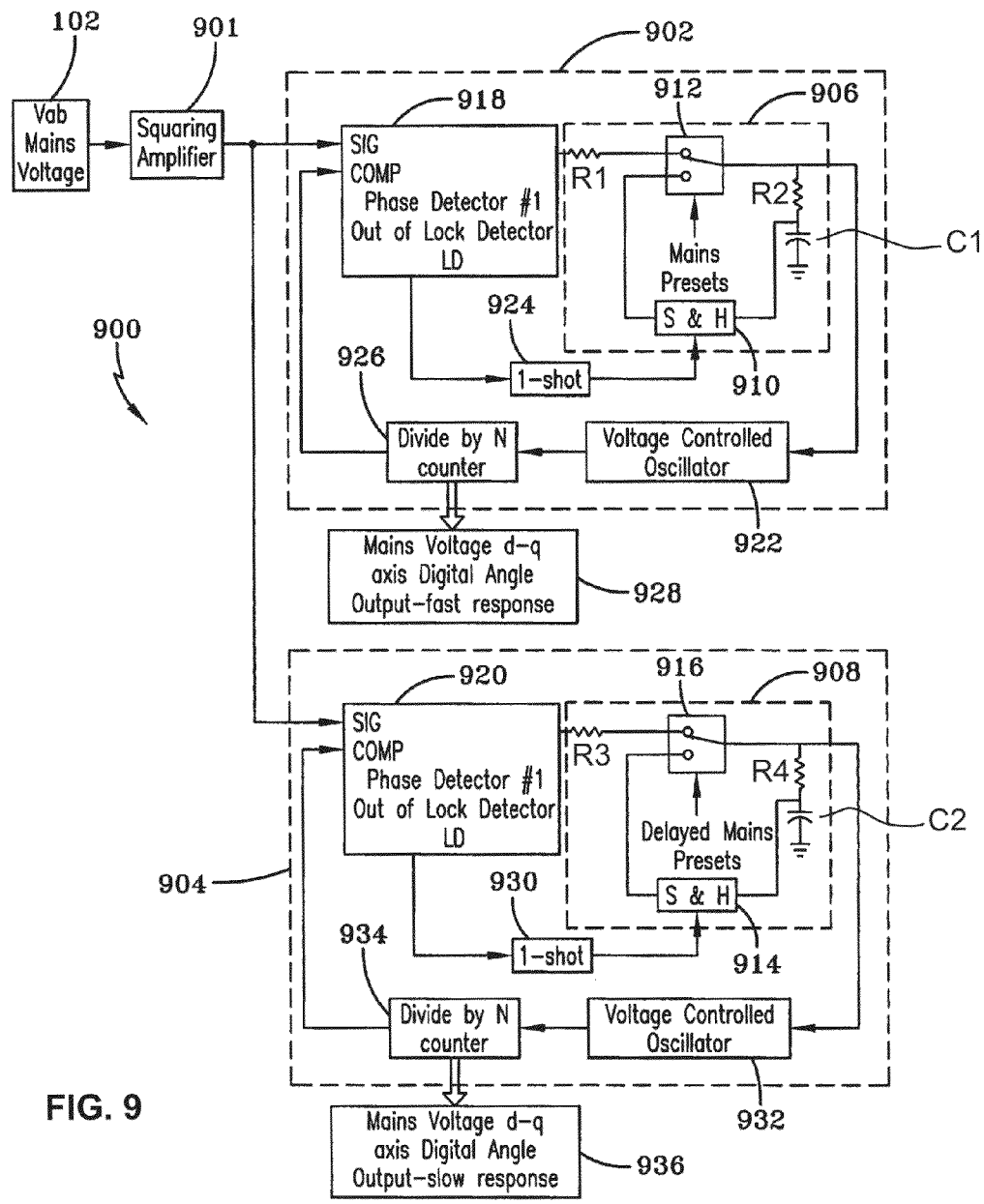
FIG. 9 shows a block diagram of an embodiment of active converter mains angle retention control.

Referring next to FIG. 9, a mains phase angle (MPA) control system 900 is shown. The control system 900 provides retention of the phase angle information for the AC input source or mains voltage 102 during input voltage dropout. The mains voltage 102 is applied to a squaring amplifier 901 to generate a substantially rectangular output signal from the ac input signal. The output of the squaring amplifier is simultaneously input to a pair of phase-locked-loops (PPLs) 902, 904. The first PLL 902 has a phase detector 918 for comparing a reference signal SIG with a comparison signal COMP for detecting when the phase of the input signal is out of phase lock with a voltage controlled oscillator (VCO) 922. If the phase detector 918 detects that the two inputs SIG and COMP are out of phase lock, a reset signal is output from terminal LD of the phase detector 918 to a 1-shot circuit 924. The 1-shot circuit 924 generates a narrow pulse input to a sample and hold (S&H) circuit 910. The output error signal of phase detector 918 is passed through a lag-lead filter circuit 906 to VCO 922. The output signal from the VCO 922 is then input to a divide-by-N circuit 926. The divide-by-N circuit 926 provides the comparison signal which is applied to the COMP terminal of the phase detector 918, and also outputs a second signal indicating the mains voltage d-q axis digital angle output fast response 928.

The second PLL 904 circuit is similarly configured as PLL 902 with phase detector 920 comparing the input reference signal SIG with a comparison signal COMP, and outputting an error signal to lag-lead filter 908. The lag-lead filter 908 has S&H circuit 914 controlled by 1-shot circuit 930 and analog switch 916. The lag-lead filter 908 can have a low cutoff frequency. The VCO 932 is input to a divide-by-N circuit 934, which generates the COMP signal input to the phase detector 920, and outputs a second signal indicating the mains voltage d-q axis digital angle output slow response 936.

The control system 900 may be used to retain synchronous operation of a VSD 104 with an active converter 202 to reduce current distortion and eliminate regeneration of energy upon reapplication of the AC input mains voltage 102—for providing extended ride-through capability in the VSD 104. Use of the two PLLs 902, 904 enables the control system 900 to maximize the ability of the active converter 202 to retain the best available knowledge of the line-to-line voltage phase angle at the AC input source 102 under all conditions. The first PLL 902 lag-lead filter 906 has a relatively high filter cutoff frequency and small value integrating capacitor C1. Filter 906 provides the active converter 202 the capability for fast and accurate phase angle tracking under normal converter operating conditions. The filter 906 components include resistor R1, resistor R2 and capacitor C1. In one embodiment, the component value for resistor R1 may be 43K ohms, for resistor R2, 120K ohms, and for capacitor C1, 0.47 uF, although the lag-lead filter 906 components R1, R2 and C1 may be varied to adjust the desired cutoff frequency of the filter 906. The second PLL 904 lag-lead filter 908 has a low cutoff frequency, a large value integrating capacitor C2, and resistors R3 and R4. The low cutoff frequency provides the lag-lead filter 908 with the capability for storing the angle of the mains voltage in the feedback loop of the PLL during mains interruption. In one embodiment, the typical component values for R3, R4 and C2 may be 510K ohms, 68K ohms and 2.2 uF, respectively. To increase the capability to retain mains or AC power source phase angle information during a power interruption, each PLL feedback loop 906, 908 includes a sample and hold (S&H) circuit 910, 914 respectively, and analog switch integrated circuits 912, 916 respectively. The S&H circuits 910, 914 with analog switches 912, 916 hold the stored charge on the integrating capacitors C1, C2 within each lag-lead filter 906, 908, and prevent the discharge of the capacitors C1, C2 through leakage to the output of the phase detectors. The component sizing of the ratio R3/R4 is also selected to minimize step change in the voltage fed to the Voltage Controlled Oscillator 932 when the analog switch 916 is transitioned.

The position of each analog switch 912, 916 is controlled by the sensing of the total loss of the mains or AC power source voltage 102 via the mains voltage detector (or mains present) circuitry. The sample and hold circuits 910, 914 are controlled by the out of phase lock detectors incorporated into each phase detector. The VCO outputs are fed to divide by n bit counters 926, 934, where n is chosen as a function of the resolution of the phase angle required in the specific application. The counter outputs are then fed back into the second input (denoted COMP) of each phase detector 918, 920 to form a closed loop. The counter outputs are also used to provide a digital word 928, 936 representative of the mains or AC power source phase angle. The digital words 928, 936 then govern the d-q angle output during mains or AC power source interruption. Selection of timing to transition the phase angle information is a function of the specific application but can be determined using the mains voltage detector (mains present) circuitry. In one embodiment the PLLs 902, 904 may be implemented using a 74HC7046 integrated circuit manufactured by Phillips Semiconductor Corp. The 74HC7046 integrated circuit includes a state machine type phase detector with out of phase lock detector and a Voltage Controlled Oscillator. The circuit design allows a power interruption of up to one second in duration without incurring phase error beyond a specified angle under worst-case conditions.

Figure 10:
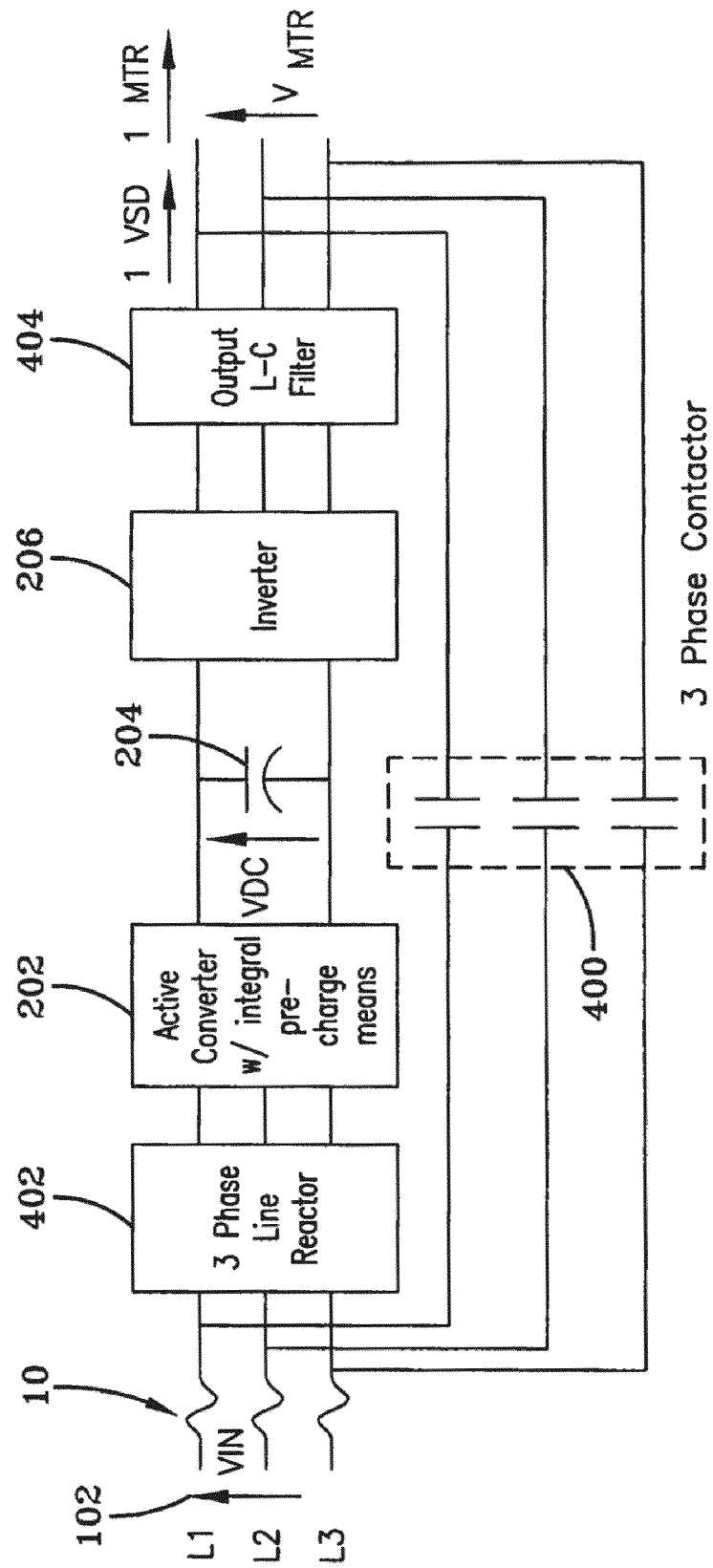
FIG. 10 shows schematically another embodiment of a variable speed drive.

Referring next to FIG. 10, a VSD 104 includes a three-phase line reactor 402 connected to the AC voltage source 102 through protective devices such as fuses 10 or a circuit breaker. The line reactor 402 enables current limiting at the input of the active converter 202 and allows for the generation of the boosted DC link voltage. An output LC filter 404 is connected to the output of the inverter 206 to filter the output waveform and attenuate electrical noise and harmonics associated with the inverter 206 output waveform. The LC filter 404 is connected in series with the inverter 206 and, e.g., the motor 106 (see, e.g., FIG. 1A). A three phase bypass contactor 400 is connected in parallel with the VSD 104, from the downstream side of the protective devices 10 to the output of the LC filter 404. The use of an active converter 202 provides fast active control of the voltage at the DC link 204. The active converter 202 provides extended ride-through capability, operating capability over a universal input voltage, and the capability of programming the AC output voltage magnitude independently of the input line voltage magnitude. Using the active converter 202, the voltage at the DC link 204 is precisely and quickly controlled. Thus, the AC output voltage of the VSD 104 is also precisely and quickly controlled. Filter 404 is connected at the output of the VSD 104 to provide sinusoidal output voltage to the motor 106. A bypass contactor 400 is incorporated within the VSD 104 to provide direct, across-the-line operation of a motor 106 at full speed. The integral bypass contactor 400 can be enabled and disabled if properly applied to the VSD 104 equipped with an active converter 202. The configuration shown in FIG. 10 permits continuous operation of the VSD 104 at either 50/60 Hz mains of AC power source operation or reduced frequency operation, without interrupting the operation of the motor 106 and compressor 302, when switching from VSD operating mode to across-the-line operating mode. Precisely controlling the VSD output voltage, frequency and phase of the frequency in synchronization with the input voltage, phase and frequency of the AC voltage source 102 provides a smooth, transparent transfer of the electrical load, between across-the-line (i.e., full mains or AC power source voltages and frequency) operation, and VSD-controlled operation, in both directions. The smooth, transparent load transfer eliminates torque excursions beyond the required torque demanded by the load. The smooth load-transfer capability eliminates driveline shock that is typically associated with transferring the power feed from VSD to mains or AC power source. As a result, a reduced-size contactor may be used to transfer the load, and inrush current is eliminated, regardless of the mode in which the VSD 104 is operating.

The power loss of the VSD 104 at full-speed operation can be reduced or eliminated by bypassing the VSD 104. Normal losses associated with a conventional VSD typically range from 2 to 3%, and the losses may range as high as 4 to 5% for a VSD that employs an active converter 202. Application of the VSD 104 with the integral bypass contactor 400 for powering an HVAC chiller system provides a significant increase in the full load KW/TR rating of the chiller system. Thus, a system with a VSD 104 equipped with an integral bypass contactor 400 provides an efficiency rating comparable with that of a system that is not equipped with a VSD 104, resulting in substantial energy savings. The energy savings and higher efficiency ratings are achievable even during periods when the full capacity of the system is required. By utilizing a VSD 104 having an active converter 202 and integral bypass contactor 400, a contactor that may typically be used for pre-charge means in existing active converter VSDs may now applied to eliminate power losses associated with the VSD 104 during full speed operation. The system of FIG. 10 thus provides, for about the same cost, a VSD-equipped system having greater full-speed and full KW/TR efficiency, when compared with conventional systems, i.e., systems having a VSD with an active converter, and without an integral bypass contactor.

Referring to FIG. 10, three input fuses 10 are included to interrupt overcurrent at the AC voltage source 102. On a per-phase basis, the parameters that must be sensed to implement the control scheme are the input voltage VIN, the DC link voltage VDC, the VSD 104 output current IVSD, and the motor current IMTR. A circuit breaker or disconnect switch (not shown) may be included at the input connection to the AC voltage source 102. The fuses 502 may be used in lieu of or in addition to a circuit breaker for overcurrent and fault protection.

To provide a smooth transition from VSD to mains or AC power source or vice versa, three conditions must be present, as follows: 1) the input RMS voltage VIN to the VSD 104 must equal the RMS output voltage to the motor; 2) the input frequency of VIN must match the frequency at the output of VSD 104; and 3) the voltage distortion present at the output of the VSD 104 must be within a predetermined minimum level. The voltage distortion requirement requires that an output L-C filter 404 must be integrated into the VSD, to remove a majority of the output voltage harmonics from the VSD's output. It is also necessary that the control scheme of the VSD 104 integrate two other features as follows: 1) output current-limiting control and 2) sensorless torque control. Output current-limiting control is configured to limit the available output current $I_{VSD}$ to a predetermined limit. Sensorless motor torque control is configured to control the motor torque using sensed parameters $I_{MTR}$ and $V_{MTR}$. To enable the VSD 104 to lock the output voltage in both phase and frequency to the AC input source 102, the AC input source 102, or $V_{IN}$, must be detected. Finally, the voltage $V_{DC}$ at the DC link 204 is detected and controlled to a predetermined voltage level to enable the VSD 104 to adjust the RMS motor voltage to match the voltage VIN at the input to the VSD 104.

The system controls are usually implemented in the system control panel 308. When the control panel 308 requires the compressor/motor 302, 106 to operate within a prescribed range below the AC voltage source frequency, the transition from VSD operation to bypass contactor operation occurs. The range may be prescribed by plotting the efficiency of the non-VSD equipped chiller against the VSD equipped chiller using the integrated part-load value (IPLV), which is a weighted average of efficiency measurements at various part-load conditions, as described in ARI Standard 550/590-98, and incorporated herein by reference. The frequency range is generally within 1.0 Hz of the maximum frequency. For example, for a 60 Hz line frequency, when operating at 59.0 Hz or above, more efficient operation is obtained by operating directly from the AC voltage source 102. In one embodiment the transition to the bypass contactor 400 does not occur until the system is operating in steady state, e.g., an actual leaving chilled water temperature is within a predetermined band, e.g., plus or minus about 0.2° F., about a leaving chilled water temperature set point.

Figure 11:
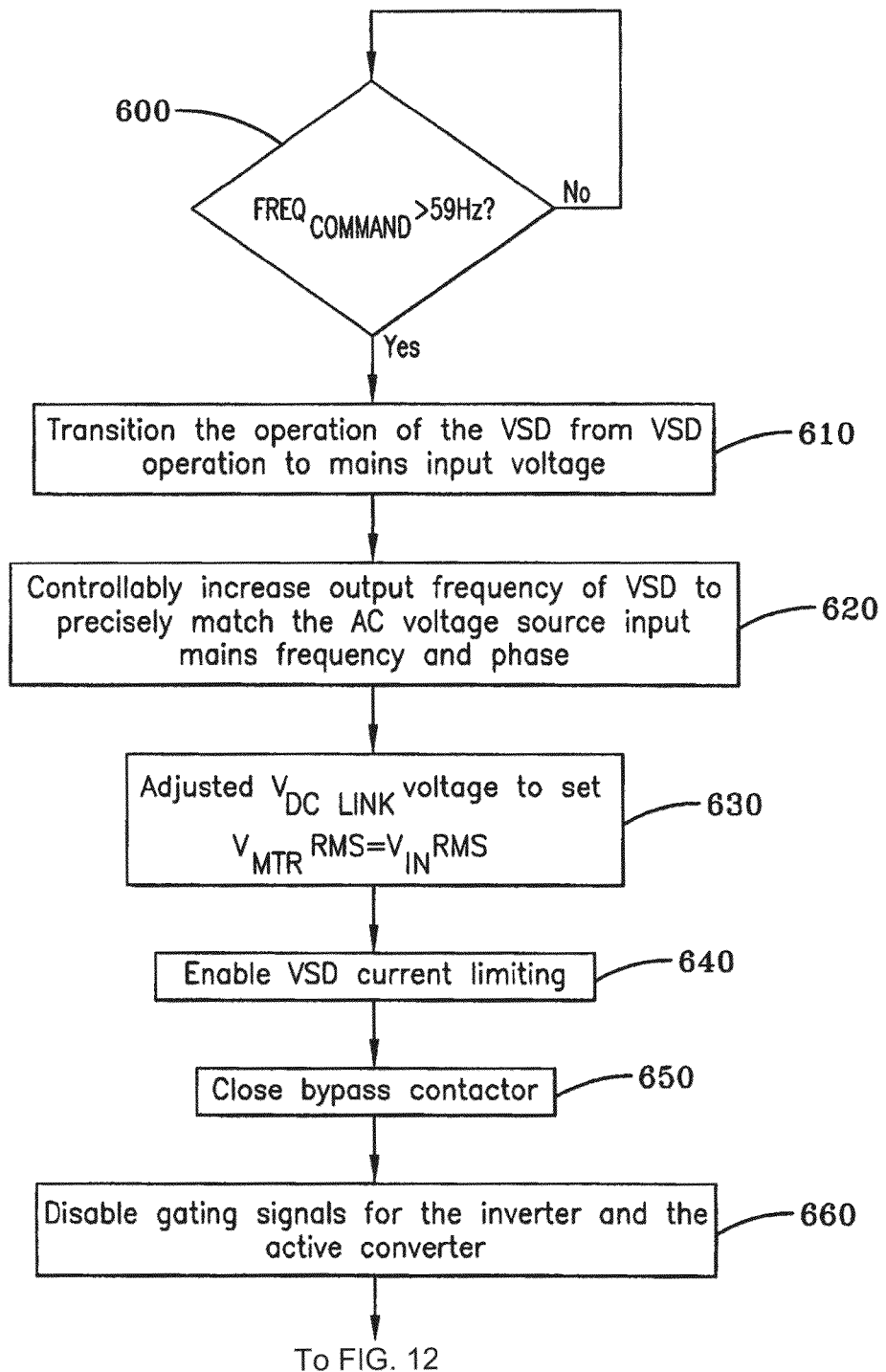
FIGS. 11 and 12 show embodiments of flow control diagrams of control algorithms for a variable speed drive.

Referring to FIG. 11, control of the VSD 104 operation is described. At step 600, the control panel determines if the VSD frequency is greater than a pre-determined frequency, e.g., VSD frequency>59 HZ, for bypass contactor operation. At step 610, a control signal is sent from the control panel 308 to transition the operation of the VSD 104 from VSD operation to full AC input voltage. At step 620, the output frequency of the VSD is controllably increased and the phase is adjusted to precisely match the AC voltage source frequency and phase. At step 630 the DC link voltage is adjusted as required to match the RMS motor voltage to the RMS input mains or AC voltage source voltage. At step 640, a current limit is enabled, and at step 650, the bypass contactor 400 is closed. At step 660 the gating signals for the inverter 206 and the active converter 202 are disabled. Although the inverter gating signals have been disabled, the DC Link voltage of the VSD remains at a level equal to approximately the peak of the input line to line mains voltage due to the inverse parallel diodes contained within the inverter section 206. The operation of the inverse parallel diodes is set forth in greater detail in commonly owned U.S. Pat. No. 7,005,829, which is hereby incorporated by reference in its entirety. With both the inverter 206 and active converter 202 gating signals disabled, the power dissipated in the VSD 104 becomes essentially zero. Motor protection means, e.g., motor overload current sensing, etc., is performed using the $I_{MTR}$ parameter and motor disconnecting means, if required, can be implemented by disengaging the bypass contactor 400. The transition method just described eliminates step changes in motor RMS voltage or motor RMS current, which in turn eliminates all torque transients and motor inrush currents caused by such step changes.

Figure 12:
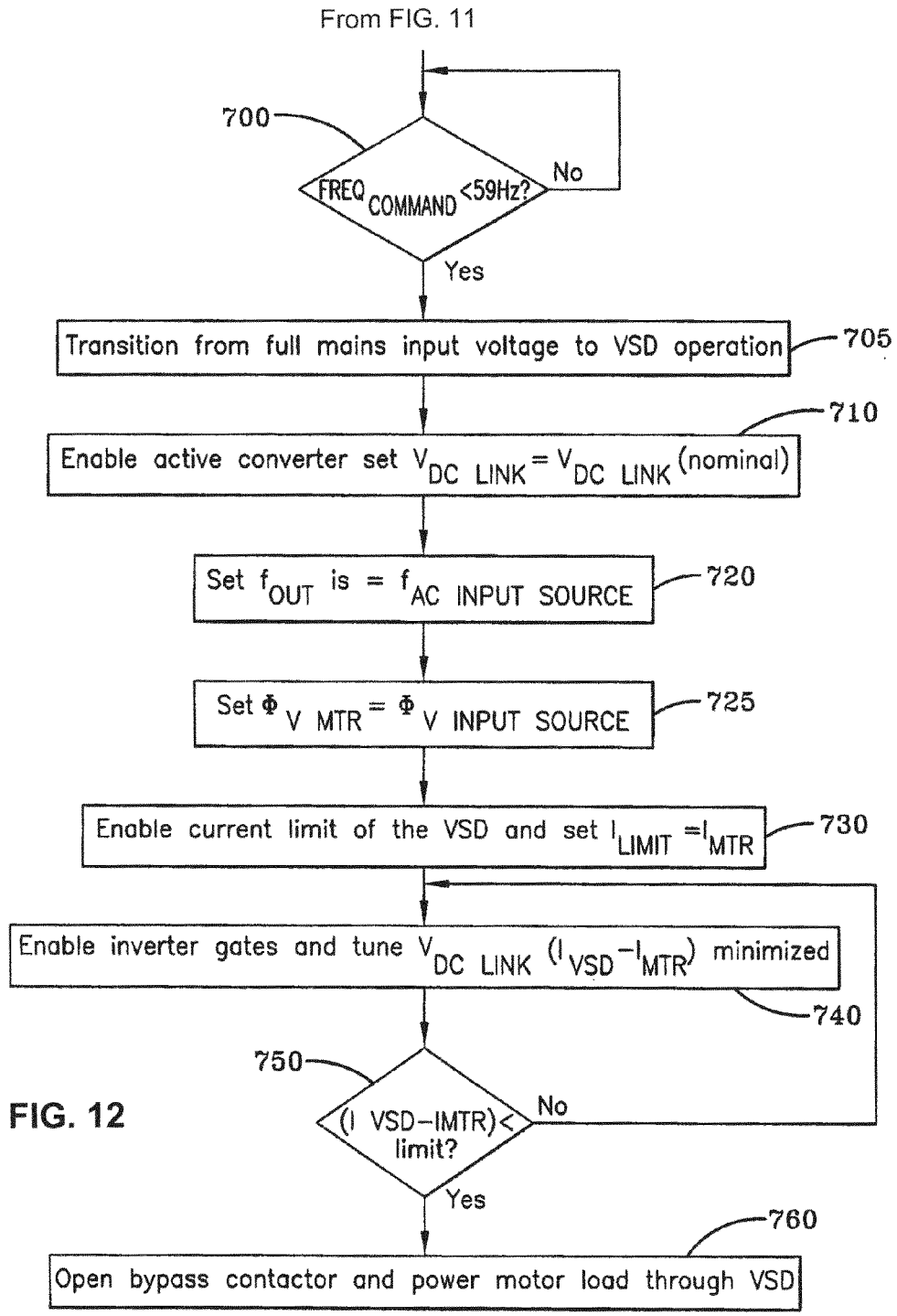

The reverse operation is set forth in FIG. 12. Transition from mains operation back to VSD operation should occur only when the system controls require the compressor/motor 302, 106 to operate at a frequency within a prescribed range below the frequency of the AC input source 102. In one embodiment, the prescribed range can be determined by the plotting the efficiency of the non-VSD-equipped compressor 302 against the VSD-equipped compressor 302 using the IPLV load line. In one embodiment, the frequency range can be below 1.0 Hz of the maximum frequency. When commanded to operate at 59.0 Hz or below, more efficient operation of the system can be obtained by operating through the VSD 104. In one embodiment, transition from bypass contactor 400 to VSD 104 may occur only when the system is operating in steady state operation e.g., an actual leaving chilled water temperature is within a predetermined range (+/−0.2 F. degrees F.) about a leaving chilled water temperature set point.

At step 700, the compressor/motor frequency $f_{MTR}$ is compared with the frequency of the AC input source 102, $f_{AC\ INPUT}$, and if the difference is greater than a predetermined amount, e.g., 1.0 Hz, at step 705, the control panel sends a command signal to initiate transition from full voltage of the AC input source, to VSD operation. The transition process commences at step 710 as follows. At step 710, the active converter 202 is enabled and $V_{DC\ LINK}$ is controlled to its nominal set point. At step 720, the output frequency is set to the sensed input frequency of the AC input source 102, and the phase of the output voltage VMTR is set to the phase of the AC input source 102. At step 730, the current limit of the VSD 104 is enabled and the current limit level is set to equal the current level of the parameter $I_{MTR}$. At step 740 the inverter gates are enabled and the DC link voltage is finely tuned until the difference between the VSD current and the motor current, i.e., parameter ($I_{VSD}$–$I_{MTR}$)—is minimized. At step 750, the control system determines whether the parameter ($I_{VSD}$–$I_{MTR}$) is within a prescribed limit. If so, at step 760, the bypass contactor 400 is opened and the VSD 104 powers the motor load. Otherwise, the control system returns to monitor the difference ($I_{VSD}$–$I_{MTR}$).

Figure 13:
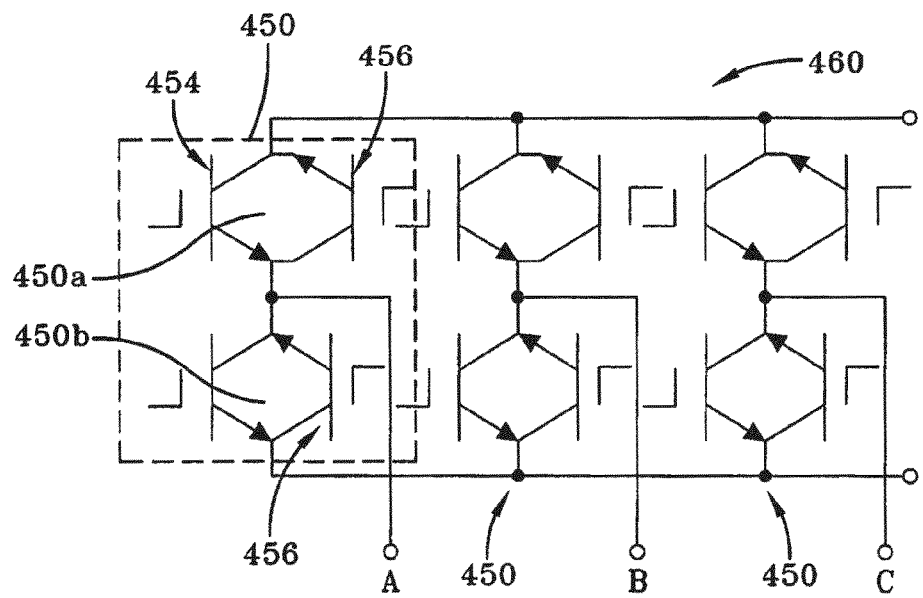
FIG. 13 shows an embodiment of an inverse parallel connection of two reverse-blocking IGBTs.

Referring to FIG. 13, a modified reverse-blocking (RB) IGBT 450 is used in each of the phases A, B and C, of the three-phase converter 202. Each modified RB IGBT 450 is formed by the inverse parallel connection of two reverse-blocking IGBTs, in upper and lower switches, 450a and 450b, respectively. The modified RB IGBTs 450 are controllable to completely extinguishing a ground fault. A diode 452 (see, e.g., FIG. 14) which normally provides a half wave conduction path around conventional or reverse-blocking IGBTs has been replaced with an anti-parallel IGBT 456. In order to ensure a complete disconnect of the VSD 104 from the motor load 106, bi-directional current flow must be extinguished in both the upper and lower portions 450a, 450b, of all three legs—A, B and C—of the active converter 202. While one phase leg of the active converter ground fault protection is described, it will be understood by those persons skilled in the art that each phase of the active converter operates in the same manner for multi-phase, e.g., three-phase, AC power systems.

Each of the upper and lower switches 450a and 450b is comprised of two RB IGBTs 454, 456. An RB IGBT is capable of blocking voltages in the reverse as well as the forward direction. A first RB IGBT 454 is connected to an inverse or anti-parallel IGBT 456. The anti-parallel IGBT 456 is also an RB-type IGBT. The anti-parallel IGBT 456 can be controlled, e.g., during a precharge operation of the DC link 204, to permit only small pulses of inrush current to reach the DC link 204. Further, the anti-parallel IGBT 456 can be controlled to conduct current in one direction at all times, similar to the anti-parallel diode 452. The RB IGBT 454 blocks a positive emitter-to-collector voltage that is approximately equal to the peak line-to-line voltage that appears across the IGBT 454. The positive emitter-to-collector voltage remains blocked for as long as the conduction of the anti-parallel IGBT 456 is delayed for the purpose of precharge. Commonly assigned U.S. Pat. No. 7,005,829 and U.S. Published Pat. App. No. 20060208685, No. 20060196203 & No. 20050122752, disclose various means to implement an active converter module to allow for pre-charging the DC link of a VSD or a parallel active harmonic filter, and the same are hereby incorporated by reference herein.

When a ground fault current is sensed by the VSD 104, both of the RB IGBTs 454, 456, in each power switch 450 are immediately turned off to preventing any current from conducting to the ground fault. The rapid switching of the RB IGBTs 454, 456 extinguishes the ground fault current in microseconds. By contrast, prior art circuit breaker mechanisms take approximately 40 milliseconds to interrupt the ground fault current.

Figure 14:
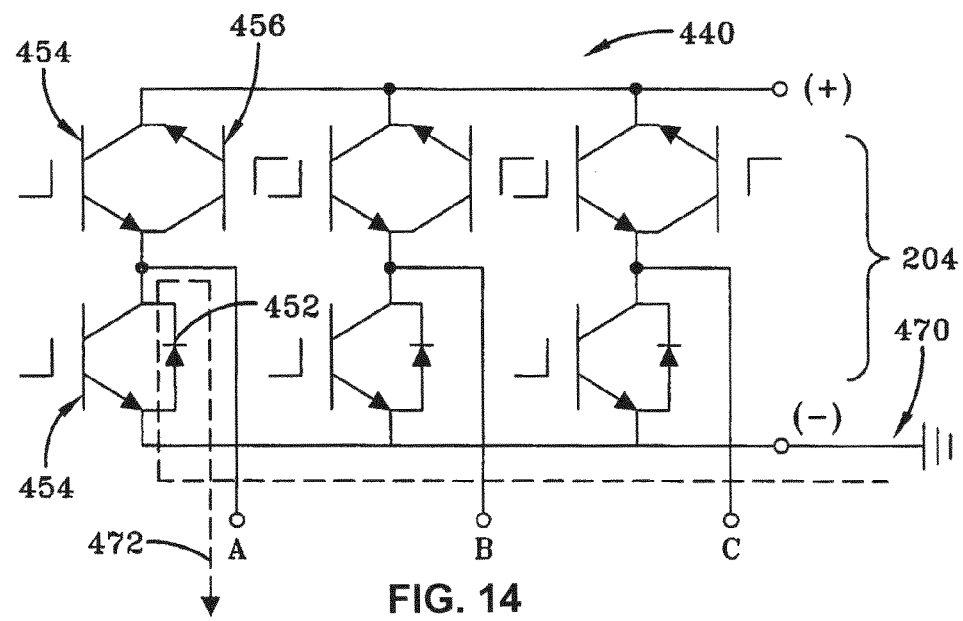
FIG. 14 shows a prior art conventional 3-phase active converter module.

Referring next to FIG. 14, a conventional 3-phase active converter module 440 includes a first RB IGBT 454 connected to an inverse or anti-parallel diode 452. The negative leg of the DC link 204 indicates a ground fault condition 470. If all of the IGBTs 454 are gated off, a current path exists, as shown by broken line and arrow 472, when the input voltage to the active converter is forward biased across diode 452. Since the conventional diode 452 does not include a gate control for controlling current flow, the fault circuit is complete. The converter module 440 also includes the corresponding control connections (not shown) to control the switching of the power switches in a manner similar to the inverter module. As can be seen by comparing the circuit in FIG. 13 with the circuit shown in FIG. 14, the active converter 460 shown in FIG. 13 has a controllable RB IGBT 456 connected in anti-parallel with the RB IGBT 454, rather than an anti-parallel connected diode 452. The RB IGBT 456 enables the active converter 440 to essentially instantaneously open the faulted circuit and extinguish the ground fault current, i.e., within microseconds. Thus, the amount of time that the system components are exposed to damaging fault current levels is comparatively minimal.

The active converter 202 ground fault protection eliminates the need for an input circuit breaker equipped with ground fault protection, or with other electro-mechanical means to process the input power. The active converter 460 configuration allows for the use of power fuses rather than more costly circuit breakers to feed the power to the input converter of a VSD, while retaining the ground fault protection feature. Fuses provide a significant reduction in the let-thru energy associated with a line-to-line fault that may occur within the VSD or filter, thereby reducing instances of the semi-conductor package rupture, or of other significant damage incurred in the case of a fault. By utilizing high speed fuses for the power feed, the arc-flash rating of the equipment (see, e.g., the National Fire and Protection Agency (NFPA) regulation 70E) can be significantly reduced. The high-speed fuses reduce the hazard associated with installing, maintaining and repairing the system. By replacing main circuit breakers with fuses at the input of the active inverter, the system can interrupt higher levels of fault current, thus enabling the use of fused-input equipment on much lower impedance mains supplies. The active converter 460 significantly reduces the energy associated with clearing the ground fault, because semiconductors and controls can detect and extinguish the ground current flow in several microseconds, as contrasted with several milliseconds for conventional topologies. The rapid response of the fuses minimizes ancillary damage associated with a ground fault. This advantage may be particularly apparent when used in HVAC&R applications where hermetic motors are employed. A ground fault occurring in the stator winding of a hermetic motor can cause significant and costly damage to the entire refrigeration circuit. Limiting the ground fault current that can flow in a stator limits collateral damage to other components of the HVAC&R system.

Figure 15:
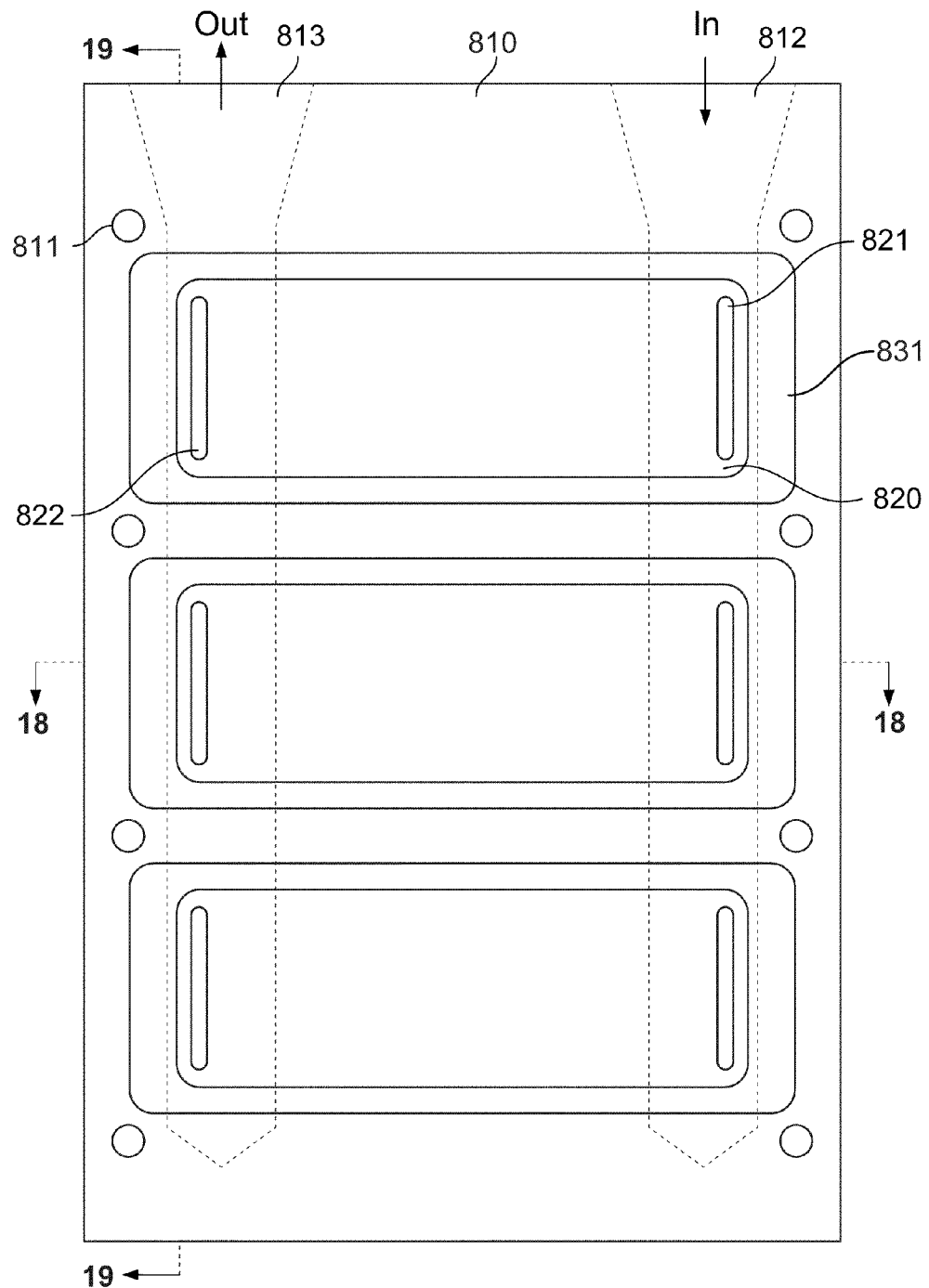
FIG. 15 shows a plan view of an embodiment of a plastic cooler.
Figure 16:
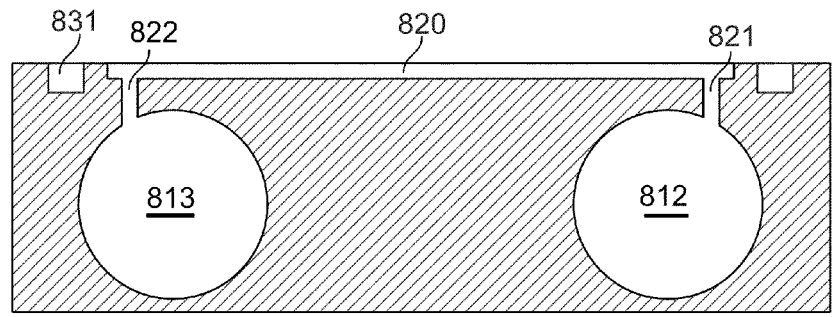
FIG. 16 shows cross-sectional view of the plastic cooler of FIG. 15 through line 3-3.
Figure 17:
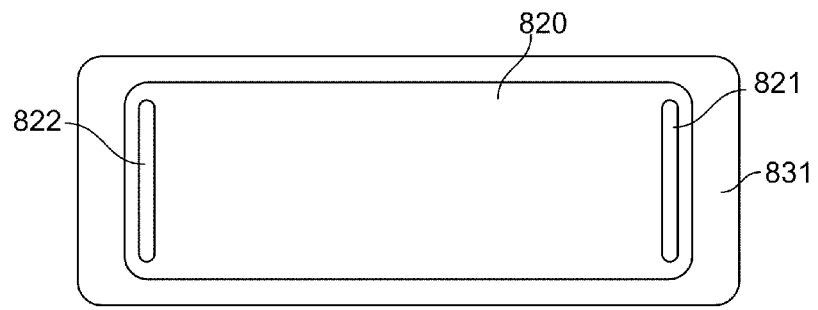
FIG. 17 shows a plan view of the well and O-ring of the plastic cooler of FIG. 15.
Figure 18:
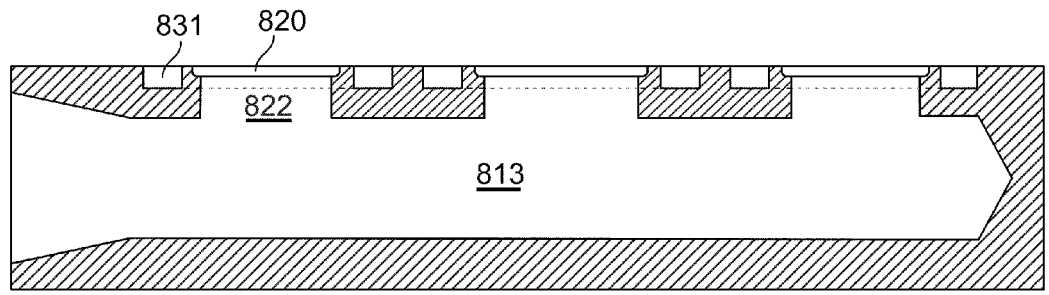
FIG. 18 shows a cross-sectional view of the plastic cooler of FIG. 15 through line 4-4.

Referring now to FIG. 15, a plastic cooler or cooling device 810 is designed to replace conventional copper heat sinks to provide cooling to a semiconductor module. While reference is made to semiconductor, SCR/Diode and insulated gate bipolar transistor (IGBT) modules, the plastic cooler 810 may be used with any suitable application where cooling is needed. The plastic coolers 810 direct the flow of coolant fluid onto the IGBT in the semi-conductor module. The coolant fluid may be any suitable fluid, e.g. water, glycol or refrigerant.

To facilitate full operation of the devices in the module, the coolers are capable of operating at a continuous use temperature of approximately 100 degrees centigrade and meet the Underwriters Laboratory approval of plastic material for flammability according to the appropriate standard (UL746A-E). The plastic material used for the coolers 810 has a low level of liquid absorption, is physically durable with a high tensile strength and may be injection molded or machined. Because the power assemblies in which the coolers 810 are mounted are cycled by both temperature and power, the plastic material must exhibit a low temperature coefficient of thermal expansion to avoid wire bond breakage within the semi-conductor module due to a mismatch of coefficient of thermal expansion between the plastic cooler and the copper laminated structures attached to the semi-conductor power device terminals. Also, the plastic cooler 810 acts as a fastener to allow for the attachment of multiple power devices together permitting a single laminated busbar structure to be used to for electrical connections, thereby allowing for a reduction in the size and weight of the overall power assembly. While the plastic material can be obtained from multiple sources, one source for the material is known under the trade name Noryl, Valox or Vespel.

One embodiment of the power assembly, shown in FIGS. 15-19, utilizes a plastic cooler 810 that directs coolant fluid onto the IGBT modules (not shown). The plastic coolers 810 are lighter than copper or aluminum based heatsinks and are cheaper to manufacture and assemble. Further, the plastic coolers 810 are advantageous because they do not corrode as coolant loops containing aluminum typically do over time. The plastic coolers allow the IGBT power module's baseplate to operate at a continuous use temperature of approximately 100 degrees centigrade. The plastic cooler 10 may use any suitable liquid for cooling, e.g., water or glycol.

The plastic cooler 810 is provided upon which an electronic component or module, including several high-speed switches, may be mounted. The plastic cooler shown in FIG. 15 has mounting holes 811. These holes can be designed to receive screws or bolts that engage the electronic component and hold it in place. Although the plastic cooler is shown using mounting holes to secure an electronic component to the base plate, other fastening devices known in the art could be used to fasten the electrical component to the plastic cooler. By means of example only, the component can be fixed to or positioned on the plastic cooler by clamping devices, adhesives, welds, etc.

Machined or otherwise formed in plastic cooler 10 are two main fluid channels 812 and 813, whereby a cooling fluid may be introduced into the plate via feed channel 812 and may exit the plate via drain channel 813. In the illustrated embodiment, these channels are relatively large, cylindrical channels that extend along the length of the plastic cooler 810. The channels are sized and designed to have a relatively low pressure drop along their lengths.

At the top of the plastic cooler are a series of concave wells 820. In an exemplary embodiment, wells 820 are surrounded by an O-ring groove 831 into which an O-ring may be placed.

The electronic devices to be cooled are then positioned in place over the wells and fastened via mounting holes 811, or other devices or means, whereby a watertight seal is created between the base of the device and the plastic cooler 810 via the O-ring. There can be an individual well for each individual electronic switch or device to be cooled, and the electronic device can be positioned directly over the well, so that the electronic device's bottom is placed in direct contact with the cooling fluid.

The wells can have a width and length, and shape, designed to match the width, length, and shape of the electronic component to be cooled. For example, in an HVAC application where the electronic components are switches, the wells have a width of approximately 1.5 inches and a length of 3 inches. Cooling fluid enters a well from feed channel 812 through an inlet port 821 formed in the well, flows through the well, and then exits out outlet port 822 and into outlet channel 813. These channels in turn are connected to a heat exchanger for cooling the cooling fluid that exits channel 13.

The plastic cooler 10 and its components are designed to provide optimum heat transfer between the cooling fluid and the electronic components, in an efficient and cost effective manner. Optimum results are achieved with wells having a depth within the range of 0.02 to 0.20 inches, coupled with a hydraulic diameter between 0.05 and 0.20, and with inlets that are 90° nozzles, applying the cooling fluid at an angle of approximately 90° against the surface of the electronic component placed over the well. The hydraulic diameter of the wells is thus defined generally by the following equation: Hydraulic Diameter=4×Cross-sectional area/(2×Well Depth+2×Well Width). The nozzles can be located at the end of a well, as shown in the Figures, so that the cooling fluid in effect bounces off both the surface of the electronic component and the walls of the well adjacent the nozzle.

The nozzles promote a high degree of turbulence due to the impingement of cooling fluid on the surface of the electronic component. This turbulence is sustained by the optimal selection of the well depth and hydraulic diameter. A shallower well depth or smaller hydraulic diameter would tend to re-laminarize the flow, thereby decreasing some of the enhancement in heat transfer. On the other hand, a deeper well depth or larger hydraulic diameter would tend to decrease the heat transfer enhancement due to a reduction in the velocity of the fluid adjacent to the surface.

The plastic cooler 810 and its components can be designed such that the pressure drop across the length of the inlet channel 812 is substantially less than the pressure drop across the wells. The pressure drop control in channel 812 can be achieved by increasing the size of at least the inlet channel, relative to the size, shape, and flow characteristics of the well and its inlets and outlets. The pressure drop across the length of inlet channel can be no greater than ¹⁄₁₀th of the pressure drop across the individual wells. In one embodiment, each of the wells has the same size, shape, and fluid flow characteristics.

Figure 19:
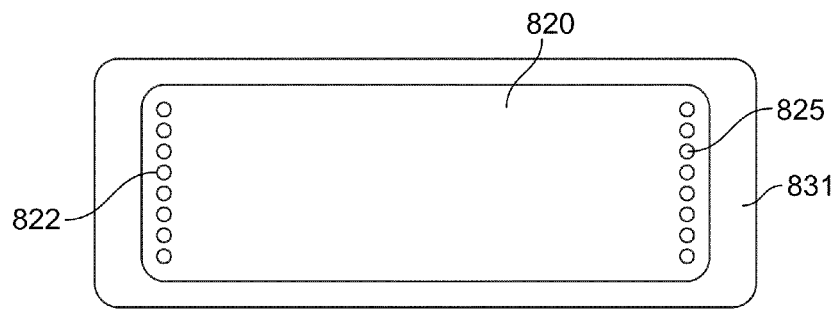
FIG. 19 shows a plan view of a second embodiment of the well and O-ring of the plastic cooler of FIG. 15.

The inlets and outlets of the wells are in the form of elongated slots. These inlet slots have a width, length, and a depth. The resultant slots are designed to serve as nozzles that direct cooling fluid against the bottom surface of the electronic components. Ports 821 and 822 are sufficiently small in comparison to channels 812 and 813 such that no appreciable pressure drop is measurable across the channel 813 as cooling liquid flows into each of the wells 820. As shown in FIG. 19, another embodiment of the inlet and outlet ports is shown whereby the inlet and outlet are actually a plurality of openings 825 formed into either end of the well 820.

The channels 812 and 813 are designed to provide substantially equal pressure along the entire length of both channels, with the result that each well 820 "sees" the same inlet pressure and pressure differential and is capable of having an equal flow and thus an equal cooling capability. The use of channels having these desired characteristics minimizes, and preferably avoids, the problem of reduced flow in each subsequent well that occurs in prior art devices.

As an example, when the wells have a width of approximately 1.291 inches, a length of approximately 4.033 inches, and a depth of approximately 0.05 inches; and when the plastic cooler includes three wells, it has been found that channels 812 and 813 with a diameter of 0.563 inches provides the desired flow and pressure drop characteristics. In that example, the ports 821 and 822 can extend along substantially the entire width of the wells and the ports have a nozzle width of approximately 0.094 inches, a length of approximately 0.906 inches, and a depth of at least 0.125 inches.

The ports can be formed as elongated slots that extend from the bottom of the well downward to the channels 812 and 813. These slots preferably are perpendicular to the surface of the plastic cooler 810. This slot configuration achieves a more turbulent flow that enhances the heat transfer without significantly impacting pressure drop. The uncomplicated shape of the wells, inlets and channels provides for much easier manufacturing than is associated with other related devices that have wells of varying depths or require the use of obstacles placed in the flow path to enhance the turbulent flow.

Also, by connecting each well 820 directly to the inlet 812 as opposed to having the cooling fluid flow in series from the first well to the last, each well is fed with fresh coolant which maximizes the cooling capability of all of the wells. Similar prior art devices utilize a single path for the coolant such that by the time the coolant reaches subsequent wells, each prior well has transferred heat into the coolant. By the time the coolant reaches the last well in a series such as this, the cooling capability of the coolant is greatly diminished.

Figure 20:
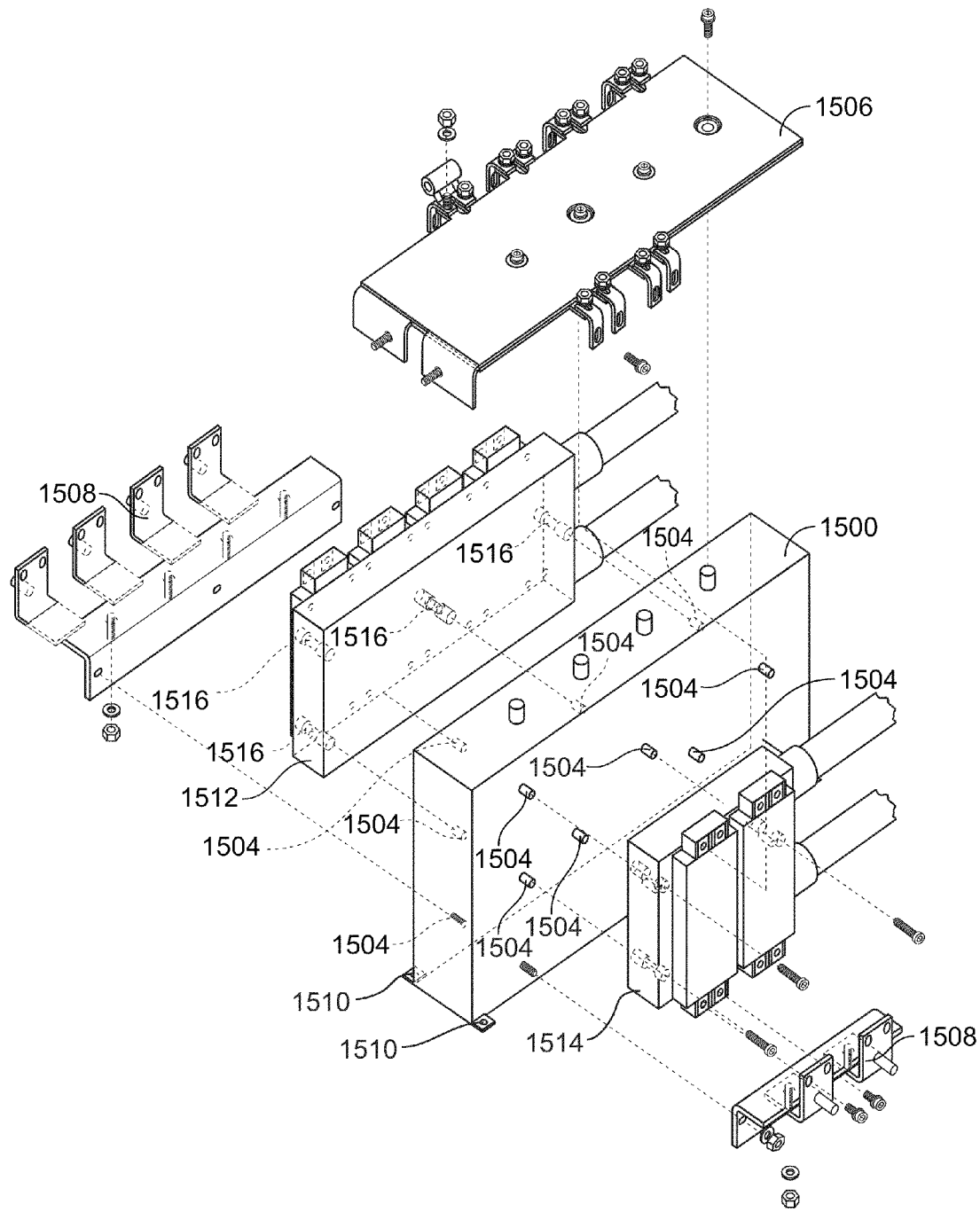
FIG. 20 shows an exploded view of an embodiment of a film capacitor.

The power assembly may operate as single phase for applications that require higher power output levels, or as three phases for applications requiring lower power output levels. Referring now to FIG. 20, film capacitors 1500 are used in place of traditional electrolytic capacitors. The use of a film capacitor 1500 reduces the cost of manufacture, reduces the total overall weight of the assembly, reduces the overall size of the assembly, and increases the reliability of the system. The film capacitor 1500 increases the reliability of the assembly by eliminating the need to evaporate electrolyte liquid present when the traditional electrolyte capacitors are used. Mounting apertures 1504 are disposed or located on the capacitors 1500 for mounting other components or subassemblies, e.g. bus plates 1506, angled bus plates 1508, cooling devices 1512 and for attaching the assembly in a VSD enclosure (not shown). In addition, mounting bases 1510 are disposed or located on the film capacitor 1500 to mount the entire assembly on a shelf or other suitable surface (not shown). Fasteners 1516, e.g. screws or other suitable fasteners, are used to mate with the apertures 1504 to secure the components to the capacitor.

In another embodiment, additional electronic components can be affixed to the plastic cooler on the surface opposite the one with the open wells. Additional open wells are included on the opposite surface, and the heat from the additional power devices is removed by the liquid coolant in the plastic cooler that is in direct contact with the bottom of the device. The additional cooling wells provides cooling to those components in a fashion similar to prior art devices by transferring the heat through the component to the plastic cooler and then to the liquid, but adds the advantage of a very compact overall package.

Figure 21:
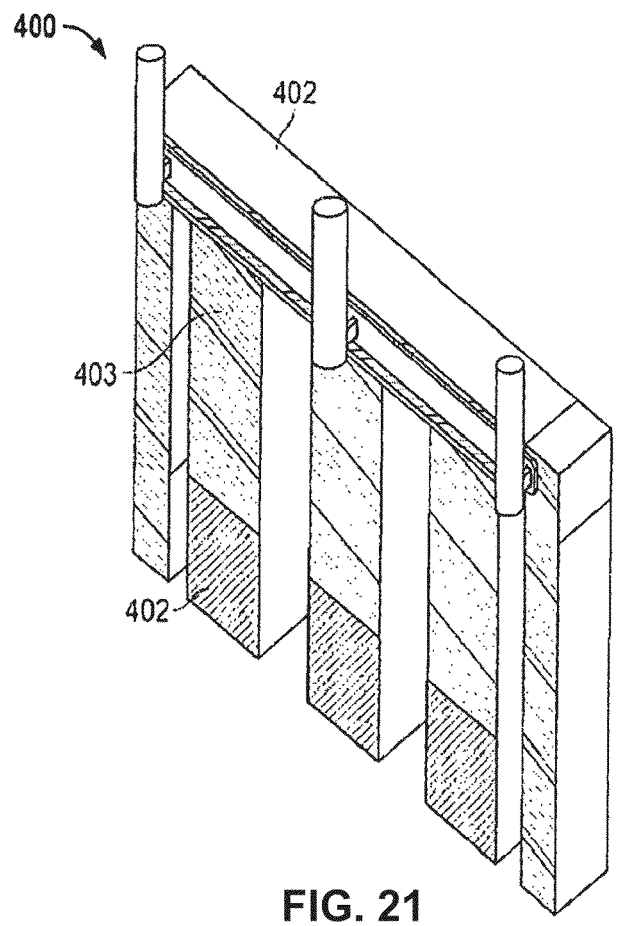
FIG. 21 shows a cross-section of an embodiment of a five-legged core, liquid cooled inductor.

Referring now to FIG. 21, inductor 400 can be composed of two major subassemblies—the core 402 and the coil 403. The core 402 subassembly is composed of a plurality of thin strips called laminations Multiple lamination sheets are stacked to form the core 402 of the inductor 400. During manufacture, silicon is added to the steel to improve the electrical resistivity of the laminations 404. Grain orientation of the laminations lowers the losses and extends the boundaries of useful operation of the core 402 material. Laminations are commonly used to minimize eddy currents and the losses associated with eddy currents, which become more of a concern as the operational frequency of the inductor rises. While silicon steel laminations will be referred to throughout the application, it is known by those of ordinary skill in the art that any type of suitable material may be used. Alternate materials include but are not limited to nickel-iron, cobalt alloys, powdered iron, ferrous alloys, molybdenum permalloy powdered iron, nickel-iron powder, ceramic ferrites, manganese zinc ferrites, nickel zinc ferrites and manganese ferrites.

Core losses are caused by hysteresis losses and eddy current losses. Core losses increase the operating temperature of the core 402 and reduce the efficiency of the inductor 400. The operating temperature of the core 402 has an influence on the other materials used in the inductor 400, such as insulating materials and varnishes. Each material has a maximum operating temperature, and the operating temperature of the core 402 determines the available options for insulating materials. As the operating temperature increases the number of available options for use as insulating materials is reduced, and the costs of the materials is increased. The useful life of the inductor may also be compromised as the operating temperature of the inductor is increased.

The coil 403 subassembly can be composed of insulating materials and current carrying conductors. The conductors may be any suitable type of conductive material, e.g. copper and aluminum. Copper conductors have a lower resistivity but a higher cost and weight than aluminum conductors. The sheets of the conductors are typically interleaved with layers of insulating material. The insulating material may be any suitable insulating material e.g. Nomex, ceramic or woven glass fiber. Air ducts are provided between the coil layers to provide for the movement of air, either forced air or natural convection, which removes the heat generated by the losses associated with the coil. The operating temperature of the coil conductors and insulators is ultimately determined by the combination of losses and air movement.

Figure 22:
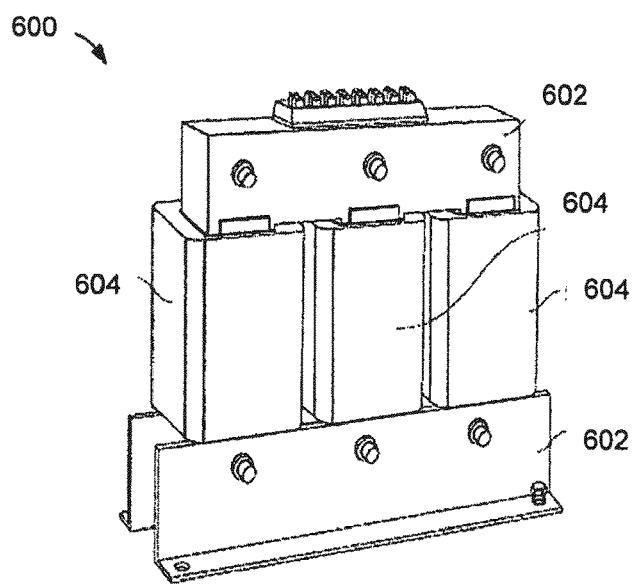
FIG. 22 shows an embodiment of a five-legged liquid-cooled inductor.

Referring to FIG. 22, the cooler (not shown) is applied to the top surfaces of the core 602 of an inductor 600. The cooler 10 uses fluid such as water, glycol or refrigerant to cool the core 602. The fluid travels through the cooler and absorbs the heat generated by the core.

To allow for heat conduction throughout the core 602 including the core gaps, a thermally conductive, non-ferromagnetic material 605 is used to provide a proper magnetic gap, while also allowing for heat transfer across that gap. A material such as a "Grade A Solid Boron Nitride" material manufactured by Saint Gobain Ceramics can be used, however one of ordinary skill in the art would know that any suitable type of material that is easily machinable and provides the necessary thermal conductivity may be used, e.g. aluminum nitride, ceramics manufactured by ANCeram and alumina ceramics manufactured by Astro Met, Inc.

The coil 604 is formed by tightly interleaving layers of aluminum or copper foil with layers of an electrically insulating and thermally conductive material in order to form a low thermal impedance coil subassembly. The heat generated at the coil subassembly is transferred by heat conduction from the coil 604 to the core and subsequently to the heatsink by where it is absorbed by the liquid flow. The electrically insulating but thermally conductive sheets of material are commonly available e.g. Cho-Therm, Therma-Gap, Therm-Attach and Therma-Flow materials manufactured by Chomerics Inc., Sil-Pad and Gap-Pad manufactured by the Berquist Company and similar products produced by Fujipoly Corp. One of ordinary skill in the art will appreciate that any suitable materials that are compatible with the standard insulating varnishes used in conventional inductor manufacturing processes, and that also exhibits tear-through capability with maximum continuous use operating temperatures approaching 200 degrees Celsius may be used. The coil layers are tightly wound around the core leg to provide a thermally conductive path to the core 602.

Figure 23:
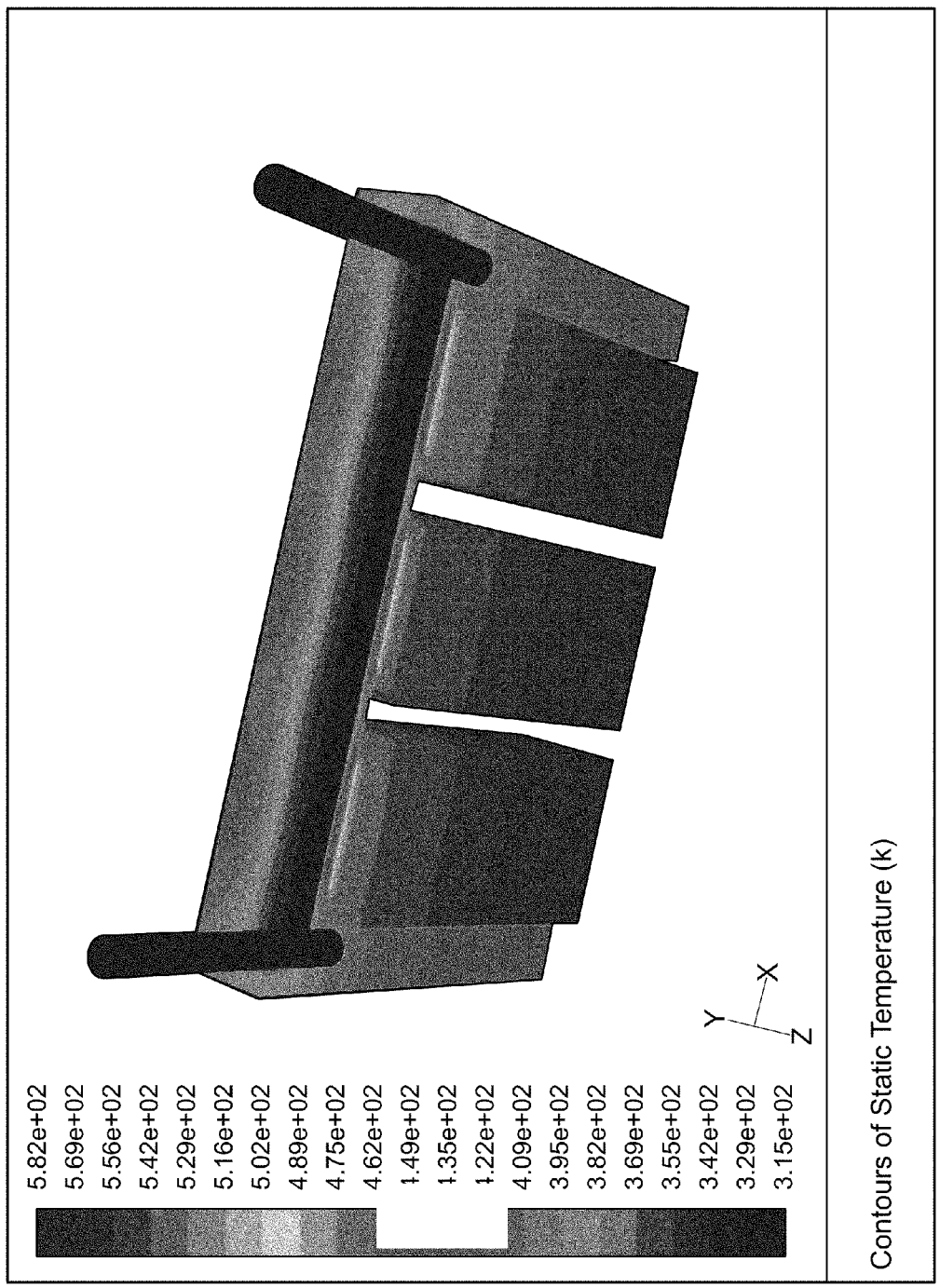
FIG. 23 shows a CFD analysis of the five-legged liquid-cooled inductor of FIG. 21.

FIG. 23 shows the results of a computer simulation intended to predict temperature distribution within the inductor 600 whose core 602 is shown in FIG. 22, by showing in shades of varying color, the thermal gradient within the inductor 600. Table 1 below shows the influence of various thermally conductive, electrically insulating materials on the peak inductor temperature rise.

TABLE 1

| Winding Material | Aluminum | | | |
|---|---|---|---|---|
| Winding Thickness [in] | 0.031 | | | |
| Thermal Conductivity of Winding Material [W/m-K] | 240 | | | |
| Heat Generation per coil [W] | 1146 | | | |
| Heat Generation in the core [W] | 344 | | | |
| Number of Winding Turns | 15 | | | |
| Gap Material | Gap Pad 1500 | Gap Pad 5000S35 | Gap Pad 3000S30 | Sil Pad 2000 |
| Gap Material Thickness [in] | 0.03 | 0.02 | 0.01 | 0.01 |
| Thermal Conductivity of Gap Material [W/m-K] | 1.5 | 5 | 3 | 3.5 |
| Overall wrapped winding thickness [in] | 0.915 | 0.765 | 0.615 | 0.615 |
| Overall winding conductivity in transverse direction [W/m-K] | 3.03 | 12.35 | 11.84 | 13.73 |
| Overall winding conductivity in parallel direction [W/m-K] | 122.70 | 147.84 | 182.20 | 182.32 |
| Maximum Temperature Rise [K] | 290.4 | 233.8 | 232.4 | 229.0 |

Conductive connectors are placed between the IGBT and the laminated copper busbar to eliminate concerns with wire bond failures.

Another embodiment includes an active converter module with an integral means to control the pre-charging of the DC link capacitors in the power assembly.

Figure 24:
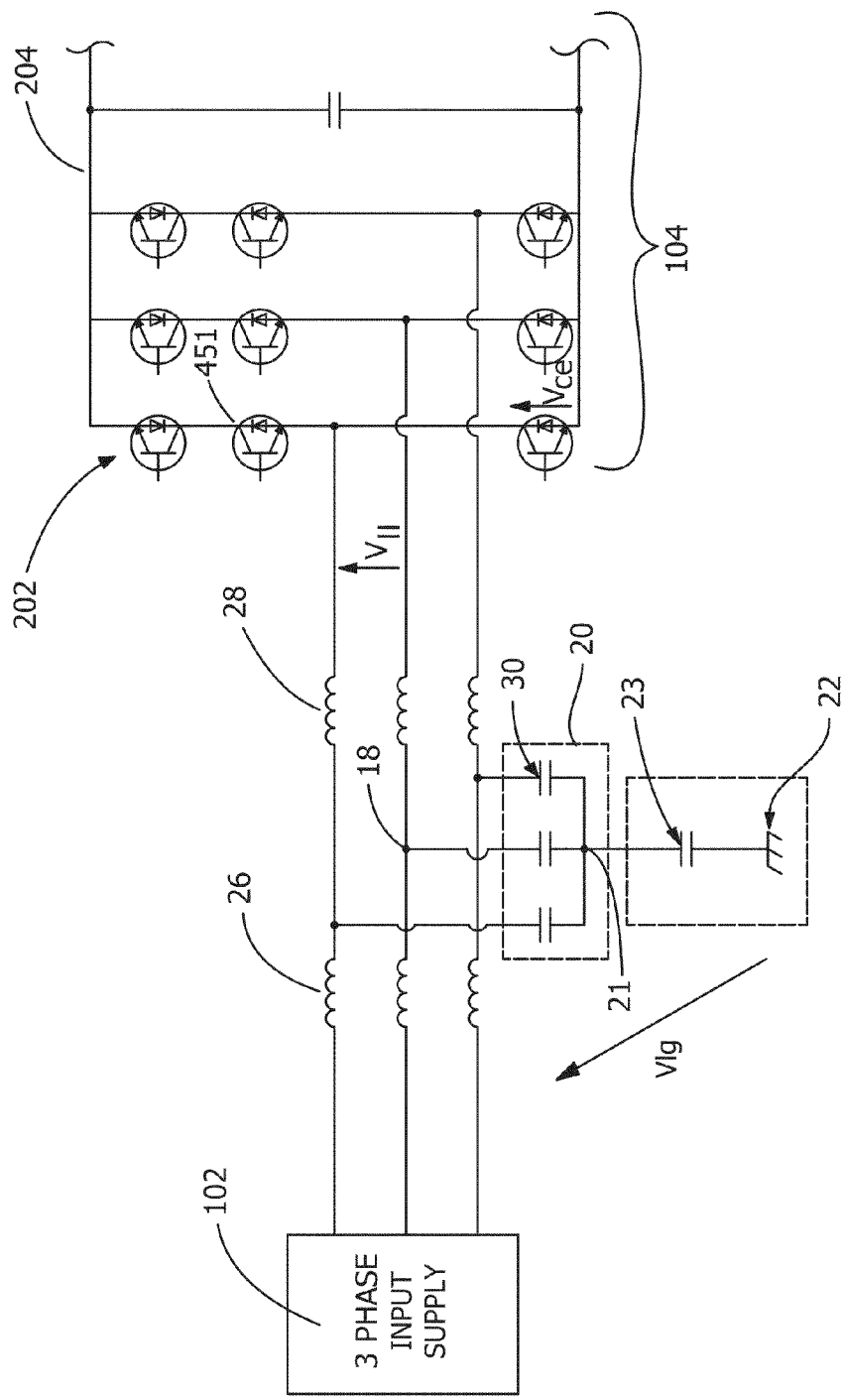
FIG. 24 shows an exemplary embodiment of a common mode capacitor circuit and active inverter module.

Referring next to FIG. 24, in one embodiment, a common mode capacitor 23 is provided on differential mode filter 20 at an input to VSD 104. Differential mode filter 20 includes three capacitors 30 wye connected between each of the three phases of three-phase input supply 102. Filter 20 is wye-connected between the inductor tap portions 18. Grounding capacitor 23 is connected to a common point 21 of filter 20. Earth connection 22 is connected to the opposite terminal of capacitor 23 from filter 20. Grounding capacitor 23 on filter 20 provides more reliable operation of VSD 104 when active converter modules 202 are used to power DC link 204. For example, in case of common mode or line to ground distortion present at the input of VSD 104. Distortion may be present in input power source 102 due to other non linear loads operating on the same power source 102, for example, another variable speed drive with active front end converter modules.

Ground capacitor 23 with the input filter inductor 26, 28, provides a filter for the line to ground voltages, thereby reducing or eliminating the high frequency distortion across the input active power devices in converter 202, e.g., IGBTs 451, or RB IGBTs 454, 456 (See, e.g., FIGS. 13, 14).

Figure 25:
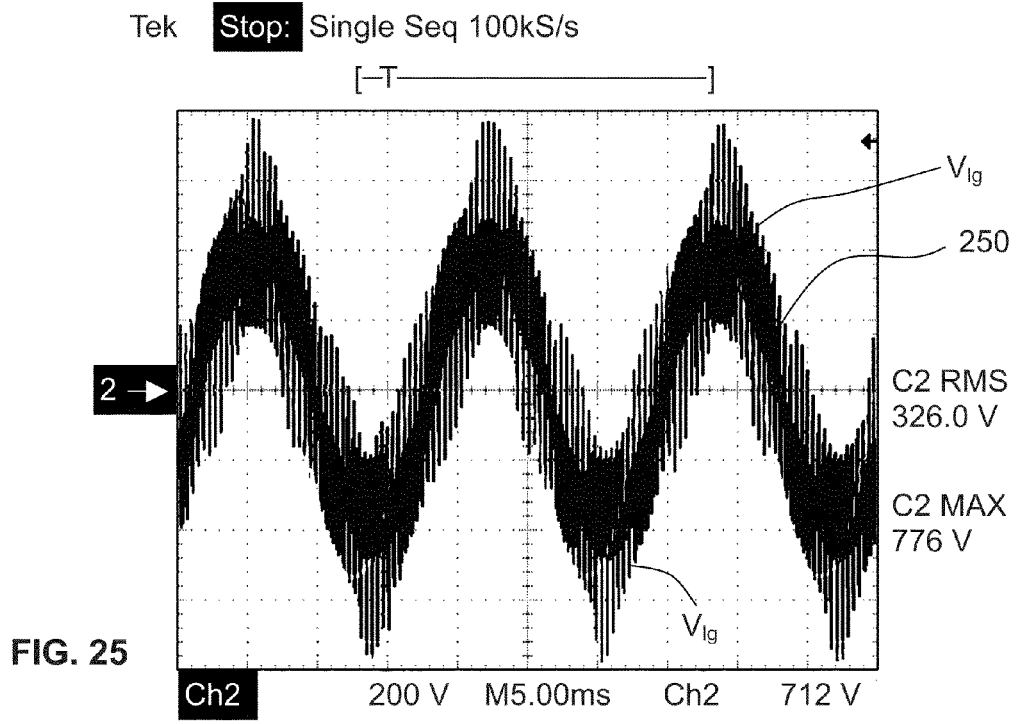
FIG. 25 shows a line-to-ground voltage waveform $V_{lg}$ for a VSD circuit having high-frequency distortion.

Referring next to FIG. 25, a voltage waveform $V_{lg}$ having high-frequency distortion is shown. Waveform 250 shows line-to-ground voltage $V_{lg}$ when common mode input capacitor 23 is not present. In the example of FIG. 25, the high frequency distortion that is shown in the voltage waveform is caused by another VSD connected to the same input power source 102.

Figure 26:
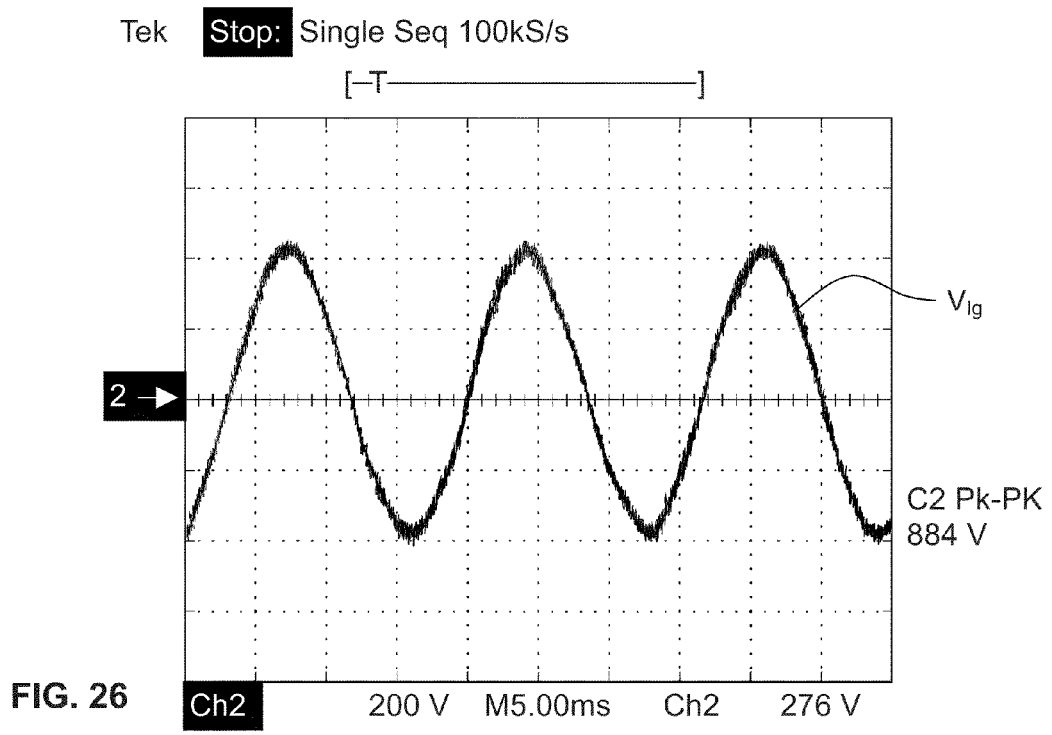
FIG. 26 shows the line-to-ground voltage waveform $V_{lg}$ of FIG. 25 modified to include a common mode capacitor.

FIG. 26 shows the line-to-ground voltage $V_{lg}$ for the same VSD circuit as that of FIG. 25, modified to include common mode capacitor 23 connected as shown in FIG. 24. Note that the high frequency noise in the voltage waveform is significantly reduced.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the common mode and differential mode filter for variable speed drives, as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

What is claimed is:

1. A variable speed drive configured to receive an input AC power at a fixed AC input voltage magnitude and frequency and provide an output AC power at a variable voltage and variable frequency, the variable speed drive comprising:
    a converter connected to a three phase AC power source providing the input AC voltage, the converter being configured to convert the input AC voltage to a boosted DC voltage;
    a DC link connected to the converter, the DC link being configured to filter and store the boosted DC voltage from the converter;
    an inverter connected to the DC link, the inverter being configured to convert the boosted DC voltage from the DC link into the output AC power having the variable voltage and the variable frequency; and a filter comprising:
        a three-phase input capacitor bank comprising three capacitors connected in a wye configuration, each capacitor of the three capacitors being connected at a first end to one phase of the three phase AC power source and at a second end to a common point with the other two capacitors;
        a grounding capacitor connected between the common point and earth ground; and
    wherein the three-phase input capacitor bank is configured to filter line to ground voltages of the three phase AC power source to reduce or substantially eliminate high frequency distortion across the converter stage.

2. The variable speed drive of claim 1, wherein the converter comprises active devices located at an input side of the converter.

3. The variable speed drive of claim 1, further comprising a three-phase inductor, the three-phase inductor comprising a phase winding for each phase of the three phase AC power source, wherein each winding of the three-phase inductor having a center tap dividing each phase winding into a pair of inductor sections; and each of the three capacitors of the input capacitor bank being connected at the first end to a respective one of the center taps of the three phase induction.

4. The variable speed drive of claim 3, wherein each of the pairs of inductor sections comprises a line side inductor and a load side inductor being connected at one end to the center tap, wherein the line side inductor being connected to the AC power source at a second end opposite the center tap, and the load side inductor being connected to the converter at a second end opposite the center tap.

5. The variable speed drive of claim 1, further comprising a three-phase line reactor connected to the AC power source, the line reactor configured to limit an input current of the converter, to filter an input waveform and to attenuate electrical noise and harmonics associated with the variable speed drive.

6. The variable speed drive of claim 1, further comprising an output filter connected at an output of the inverter, the output filter configured to filter the output waveform of the variable speed drive and to attenuate electrical noise and harmonics associated with the inverter.

7. The variable speed drive of claim 6, wherein the converter further includes at least two semiconductor switches for each phase of the AC power source.

8. The variable speed drive of claim 7, wherein each of the at least two semiconductor switches comprises a pair of reverse blocking IGBTs inversely connected in parallel.

9. The variable speed drive of claim 8, wherein each semiconductor switch comprises an inverse parallel connection of the pair of the reverse blocking IGBTs.

10. The variable speed drive of claim 9, wherein each of the reverse blocking IGBTs is controllable by a controller to completely extinguishing a ground fault current.

11. The variable speed drive of claim 10, wherein the controller is configured to extinguish bi-directional current flow in a first semiconductor switch and a second semiconductor switch, for each of the three legs of the converter, to ensure a complete disconnect of the variable speed drive from a motor load connected to an output of the variable speed drive.

12. The variable speed drive of claim 9, wherein one reverse blocking IGBT of the pair of reverse blocking IGBTs of each semiconductor switch is controlled to permit only small pulses of inrush current to reach the DC link.

13. The filter of claim 1, wherein the inverter is connected to an output capacitor bank of three capacitors, each capacitor connected in a wye configuration to an output phase of the inductor;
    each of the three capacitors of the output capacitor bank being connected in common at an end opposite the output phase connection; the common capacitor connection also being connected to earth.

14. The filter of claim 1, further comprising: an output inductor having three output phase windings connected in series with the output phase of the inverter; and
    a second output capacitor bank of three capacitors, each capacitor of the second output capacitor bank being connected in a wye configuration to a load side of the output inductor;
    wherein currents induced by differential mode voltage components are removed from the load side of the output inductor and prevented from flowing to a load connected to the output inductor.

15. A filter for reducing or eliminating high frequency distortion of line to ground voltages in a variable speed drive, the filter comprising:
    a three-phase inductor having three windings, wherein each winding of the three-phase inductor further comprising a center tap, the center tap dividing each winding of the three-phase inductor into a pair of inductor sections;
    a three-phase capacitor bank having three capacitors connected in a wye configuration to the three center taps at one end, and to a common point at an opposite end; and
    a grounding capacitor connected between the common point and earth ground;
    wherein the three-phase capacitor bank is configured to filter line to ground voltages to substantially eliminate high frequency voltage transients across an input of a converter of a variable speed drive.

16. The filter of claim 15, wherein each pair of inductor sections comprises a line side inductor portion and a load side inductor portion connected at one end to the center tap, and the line side inductor portion being connected to an AC power source at a second end opposite the center tap, and the load side inductor portion being connected to the converter of the variable speed drive at a second end opposite the center tap.

17. The filter of claim 15, wherein the three-phase inductor is a five legged inductor comprising:
    a core element having at least three leg portions, each leg portion being wound with a pair of electric current carrying coils, and a flux portion, the flux portion connecting the at least three leg portions in a continuous magnetic path, the flux portion having a pair of vertical legs connected at a top end by a top leg and at a bottom end by a bottom leg to form a substantially rectangular frame portion, the three leg portions being positioned within and in magnetic communication with the frame portion.

18. The filter of claim 15, wherein the three phase inductor is a four legged inductor, comprising:
    a core element having at least three leg portions, each leg portion being wound with a pair of electrical coils, and a flux portion, the flux portion connecting the three leg portions in a continuous magnetic path, the flux portion providing a common flux path, the flux path being excited by common mode current components flowing through the electrical coils.

19. The filter of claim 15, wherein the filter is connected between an AC power source and the converter.

* * * * *